(12) United States Patent
Woo

(10) Patent No.: US 12,140,271 B2
(45) Date of Patent: Nov. 12, 2024

(54) PRESSURE VESSEL ASSEMBLY AND PRESSURE VESSEL PROTECTOR

(71) Applicants: HYUNDAI MOTOR COMPANY, Seoul (KR); KIA CORPORATION, Seoul (KR)

(72) Inventor: Myeong Nam Woo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/992,358

(22) Filed: Nov. 22, 2022

(65) Prior Publication Data
US 2023/0213145 A1    Jul. 6, 2023

(30) Foreign Application Priority Data

Jan. 5, 2022   (KR) .................. 10-2022-0001763
Jan. 10, 2022  (KR) .................. 10-2022-0003440
Jan. 13, 2022  (KR) .................. 10-2022-0005310

(51) Int. Cl.
F17C 1/04       (2006.01)

(52) U.S. Cl.
CPC ........ *F17C 1/04* (2013.01); *F17C 2201/0109* (2013.01); *F17C 2201/035* (2013.01);
(Continued)

(58) Field of Classification Search
CPC ............... F17C 1/04; F17C 2201/0109; F17C 2201/035; F17C 2203/0604; F17C 2203/0663; F17C 2209/2118; F17C 2221/012; F17C 2270/0105; F17C 2270/0171; F17C 2270/0189; F17C 2205/0196; F17C 1/08; F17C 2203/011;
(Continued)

(56) References Cited

U.S. PATENT DOCUMENTS 9,254,586 B2 *   2/2016  Geurtz .................. B60K 15/03
2009/0014453 A1* 1/2009  Bleys ....................... F17C 1/14
                                                          137/382

(Continued)

FOREIGN PATENT DOCUMENTS

CN   108700256 A  * 10/2018 ............. F17C 1/06
DE    19935517 A1 *  2/2001 ............. F17C 1/02
KR   20230095149 A  *  6/2023

OTHER PUBLICATIONS

English Machine Translation of DE-19935517-A1 (Year: 2001).*
English Machine Translation of CN-108700256-A (Year: 2018).*
English Machine Translation of KR-20230095149-A (Year: 2023).*

*Primary Examiner* — Nathan J Jenness
*Assistant Examiner* — Laura E. Parker
(74) *Attorney, Agent, or Firm* — MORGAN, LEWIS & BOCKIUS LLP

(57) ABSTRACT

A pressure vessel assembly including a pressure vessel including a cylinder part and a first side part and a second side part, the first side part and the second side part each having a dome shape and being provided at two opposite ends of the cylinder part, nozzle members respectively provided on the first side part and the second side part, and a plurality of protectors connected to the nozzle members and configured to surround a respective outer surface of the first side part or the second side part.

16 Claims, 14 Drawing Sheets

(52) U.S. Cl.
CPC .............. *F17C 2203/0604* (2013.01); *F17C 2203/0663* (2013.01); *F17C 2209/2118* (2013.01); *F17C 2221/012* (2013.01); *F17C 2270/0105* (2013.01); *F17C 2270/0171* (2013.01); *F17C 2270/0189* (2013.01)

(58) Field of Classification Search
CPC ........ F17C 2203/0658; F17C 2203/066; F17C 2203/0612–0624
USPC ....................................................... 220/581
See application file for complete search history.

(56) References Cited

U.S. PATENT DOCUMENTS

| | | | | |
|---|---|---|---|---|
| 2009/0200319 | A1* | 8/2009 | Vinjamuri | F17C 13/06 |
| | | | | 220/589 |
| 2011/0278316 | A1* | 11/2011 | Herzer | F17C 13/06 |
| | | | | 137/382 |
| 2018/0156387 | A1* | 6/2018 | Maekawa | F17C 13/04 |
| 2018/0202553 | A1* | 7/2018 | Ueda | B32B 25/10 |
| 2019/0093827 | A1* | 3/2019 | Yeggy | F17C 13/083 |
| 2023/0091329 | A1* | 3/2023 | Fujii | F17C 1/16 |
| | | | | 220/203.23 |

* cited by examiner

PRESSURE VESSEL ASSEMBLY AND PRESSURE VESSEL PROTECTOR

CROSS-REFERENCE TO RELATED APPLICATION

This application claims the benefit under 35 USC § 119(a) of Korean Patent Application No. 10-2022-0005310 filed in the Korean Intellectual Property Office on Jan. 13, 2022, Korean Patent Application No. 10-2022-0001763 filed in the Korean Intellectual Property Office on Jan. 5, 2022, and Korean Patent Application No. 10-2022-0003440 filed in the Korean Intellectual Property Office on Jan. 10, 2022, the entire contents of which are incorporated herein by reference for all purposes.

BACKGROUND

1. Field

The present disclosure relates to a pressure vessel assembly and a pressure vessel protector, and more particularly, to a pressure vessel assembly and a pressure vessel protector, which are capable of inhibiting damage to and breakage of a pressure vessel and improving safety and reliability of the pressure vessel.

2. Description of Related Art

A hydrogen vehicle (e.g., a passenger vehicle or a commercial vehicle) is configured to autonomously generate electricity by means of a chemical reaction between hydrogen and oxygen and travel by operating a motor. More specifically, the hydrogen vehicle includes a pressure vessel configured to store hydrogen ($H_2$), a fuel cell stack configured to produce electricity by means of an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the pressure vessel of the hydrogen vehicle. The TYPE 4 pressure vessel may include a liner (made of e.g., a nonmetallic material), and a carbon fiber layer made by winding a carbon fiber composite material around an outer surface of the liner.

However, because of characteristics of the structure of the pressure vessel in the related art in which two opposite side parts of the pressure vessel each have a dome shape, it is difficult to wind a carbon fiber composite material, with a sufficient thickness, around the side part of the pressure vessel. For this reason, there is a problem in that it is difficult to ensure sufficient structural rigidity of the side part of the pressure vessel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a pressure vessel assembly including a pressure vessel that includes a cylinder part, a first side part and a second side part, the first side part and the second side part each having a dome shape and being provided at two opposite ends of the cylinder part, and nozzle members respectively provided on the first side part and the second side part, and a plurality of protectors connected to the nozzle members and configured to surround a respective outer surface of the first side part and the second side part.

The plurality of protectors may each have a dome shape corresponding to a shape of a respective side part of the first side part and the second side part.

Each of the plurality of protectors may include a protector body connected to a respective nozzle member and configured to cover the respective outer surface and an elastic layer provided on the protector body and configured to come into contact with the respective outer surface.

The elastic layer may be integrated with each of the plurality of protectors by injection molding and the elastic layer may be configured to cover a surface of the protector body.

The pressure vessel assembly may also include an exposure hole provided in the protector body and the nozzle members may pass through the exposure hole and are exposed to an outside of the protector.

The pressure vessel assembly may also include a first screw thread portion provided on an outer peripheral surface of the nozzle members and a second screw thread portion provided on an inner wall surface of the exposure hole and configured to be screw-fastened to the first screw thread portion.

The pressure vessel assembly may also include a support member configured to be rectilinearly movable along a non-screw thread portion defined on an outer peripheral surface of the nozzle members, the support member being configured to support the nozzle members on an object.

The pressure vessel assembly may have a tool seat portion provided on the protector body and configured to be fastened to a fastening tool.

The pressure vessel assembly may also have a first through-hole provided in the protector body and disposed adjacent to the exposure hole, the first through-hole being exposed to an outside of the elastic layer.

The pressure vessel assembly may also include a second through-hole provided in the protector body and spaced apart from the first through-hole, the second through-hole being filled with the elastic layer.

In another general aspect, here is provided a pressure vessel protector, which protects a pressure vessel including a cylinder part, side parts provided at two opposite ends of the cylinder part and each having a dome shape, and nozzle members respectively provided on the side parts, the pressure vessel protector including a protector body connected to a respective nozzle member of the nozzle members and configured to surround an outer surface of a respective side part of the side parts and an elastic layer provided on the protector body and configured to come into contact with the outer surface of the respective side part.

The elastic layer may be integrated with the protector body by injection molding, and the elastic layer is configured to cover a surface of the protector body.

The pressure vessel protector may also include an exposure hole provided in the protector body. A respective nozzle member of the nozzle members may pass through the exposure hole and be exposed to an outside of the protector body.

The pressure vessel protector may also include a first screw thread portion provided on an outer peripheral surface of the respective nozzle member and a second screw thread portion provided on an inner wall surface of the exposure hole and configured to be screw-fastened to the first screw thread portion.

A tool seat portion may be provided on the protector body, the tool seat portion being configured to be fastened to a fastening tool.

The pressure vessel protector may further include a first through-hole provided in the protector body and disposed adjacent to the exposure hole. The first through-hole being exposed to an outside of the elastic layer.

The pressure vessel protector may also include a second through-hole provided in the protector body and spaced apart from the first through-hole and the second through-hole being filled with the elastic layer.

Other features and aspects will be apparent from the following detailed description, the drawings, and the claims.

Figure 1:
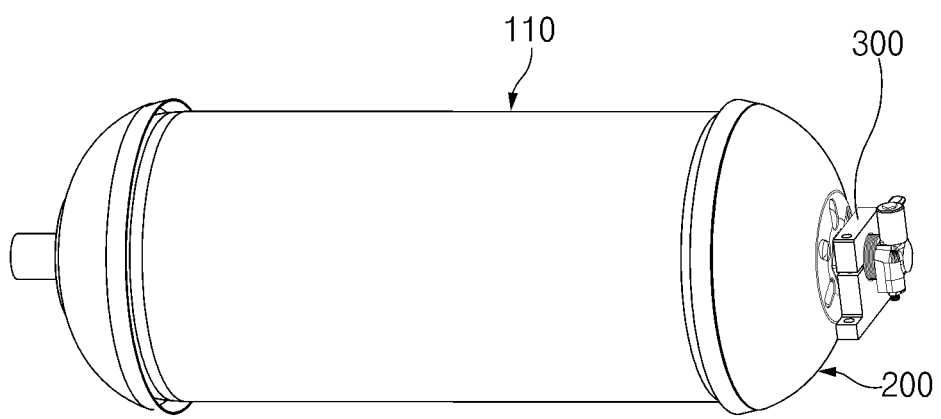
FIG. 1 is a view for explaining a pressure vessel assembly according to a first embodiment of the present disclosure.
Figure 2:
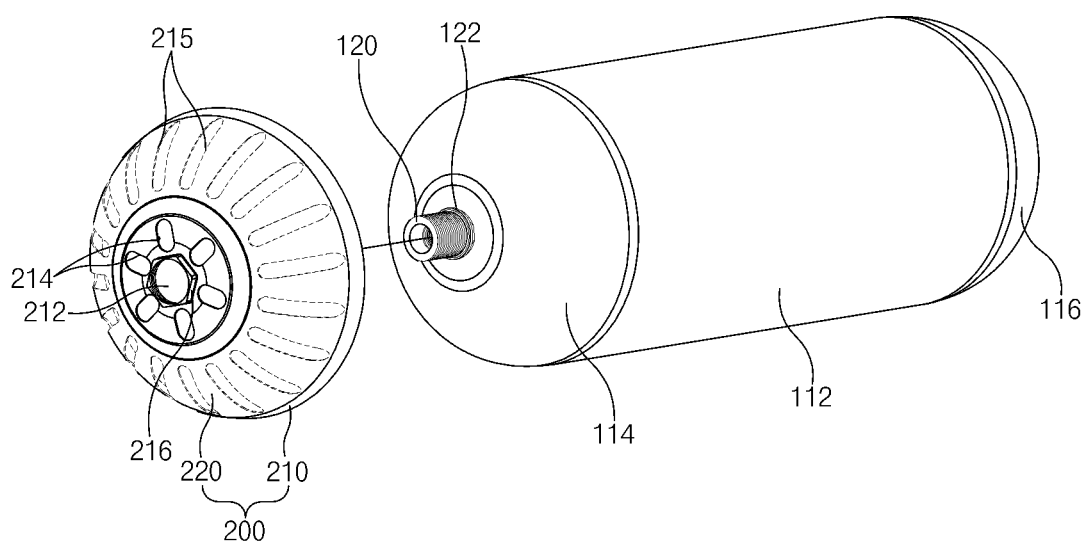
FIG. 2 is a view for explaining a pressure vessel protector according to the first embodiment of the present disclosure.
Figure 3:
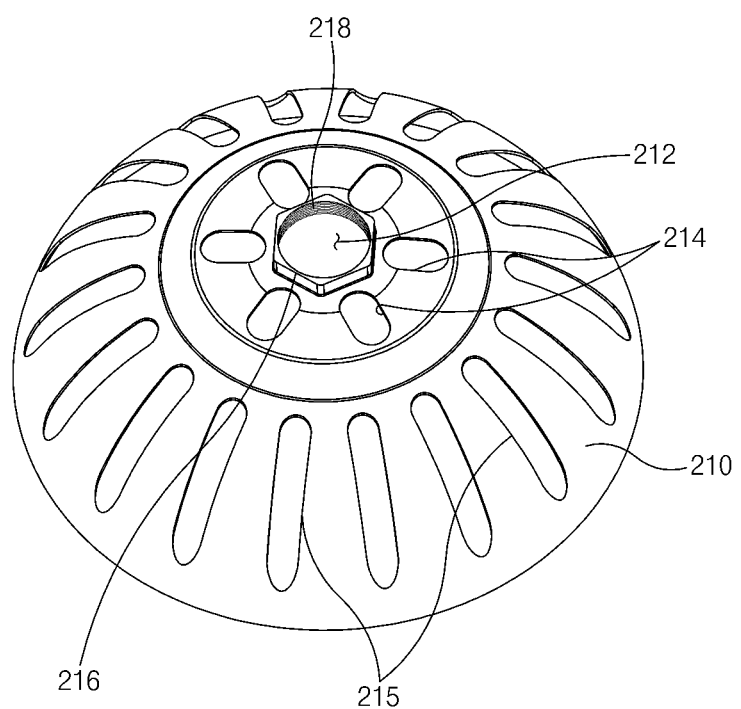
FIG. 3 is a view for explaining a protector body of the pressure vessel protector according to the first embodiment of the present disclosure.
Figure 4:
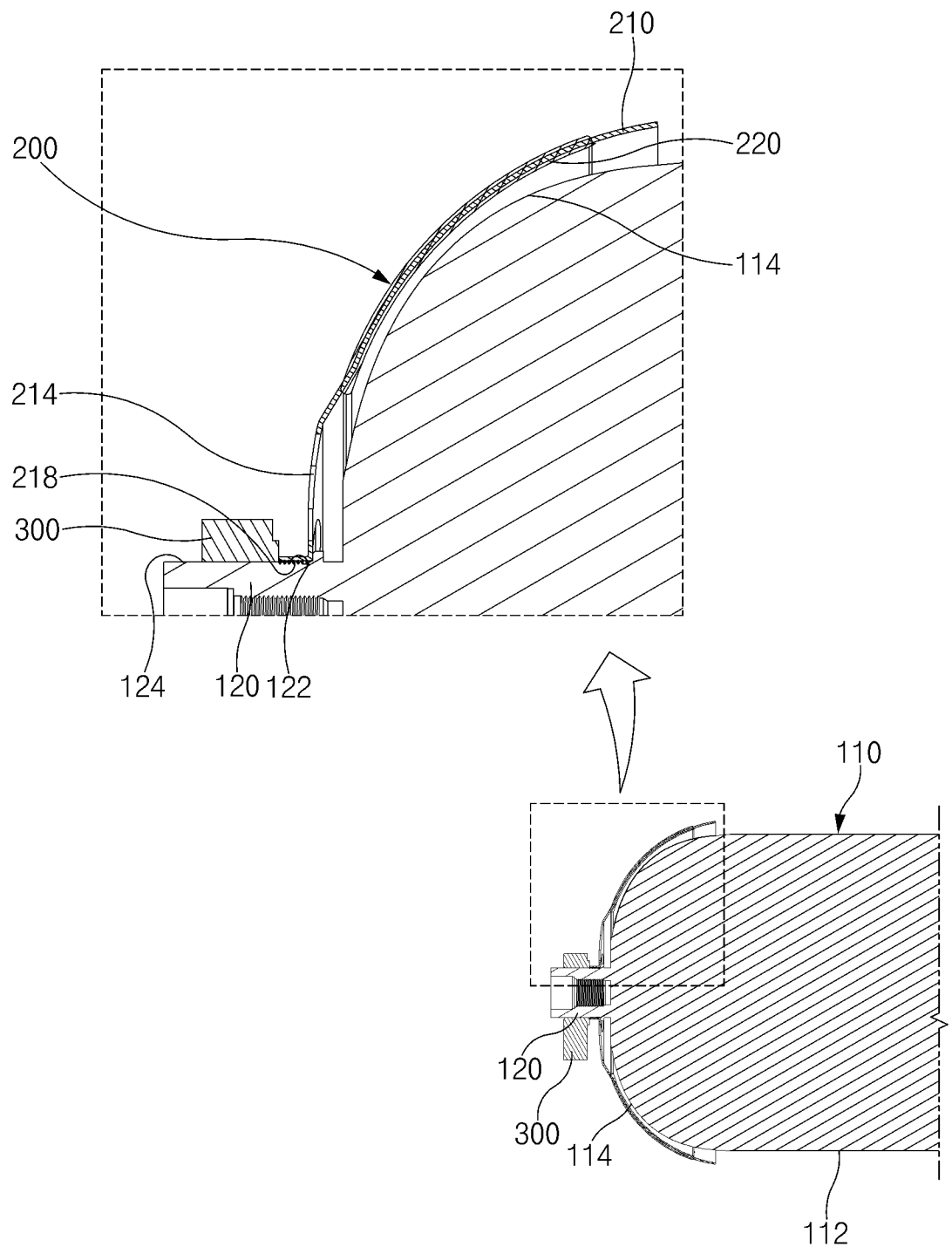
FIG. 4 is a cross-sectional view for explaining the pressure vessel protector according to the first embodiment of the present disclosure.
Figure 5:
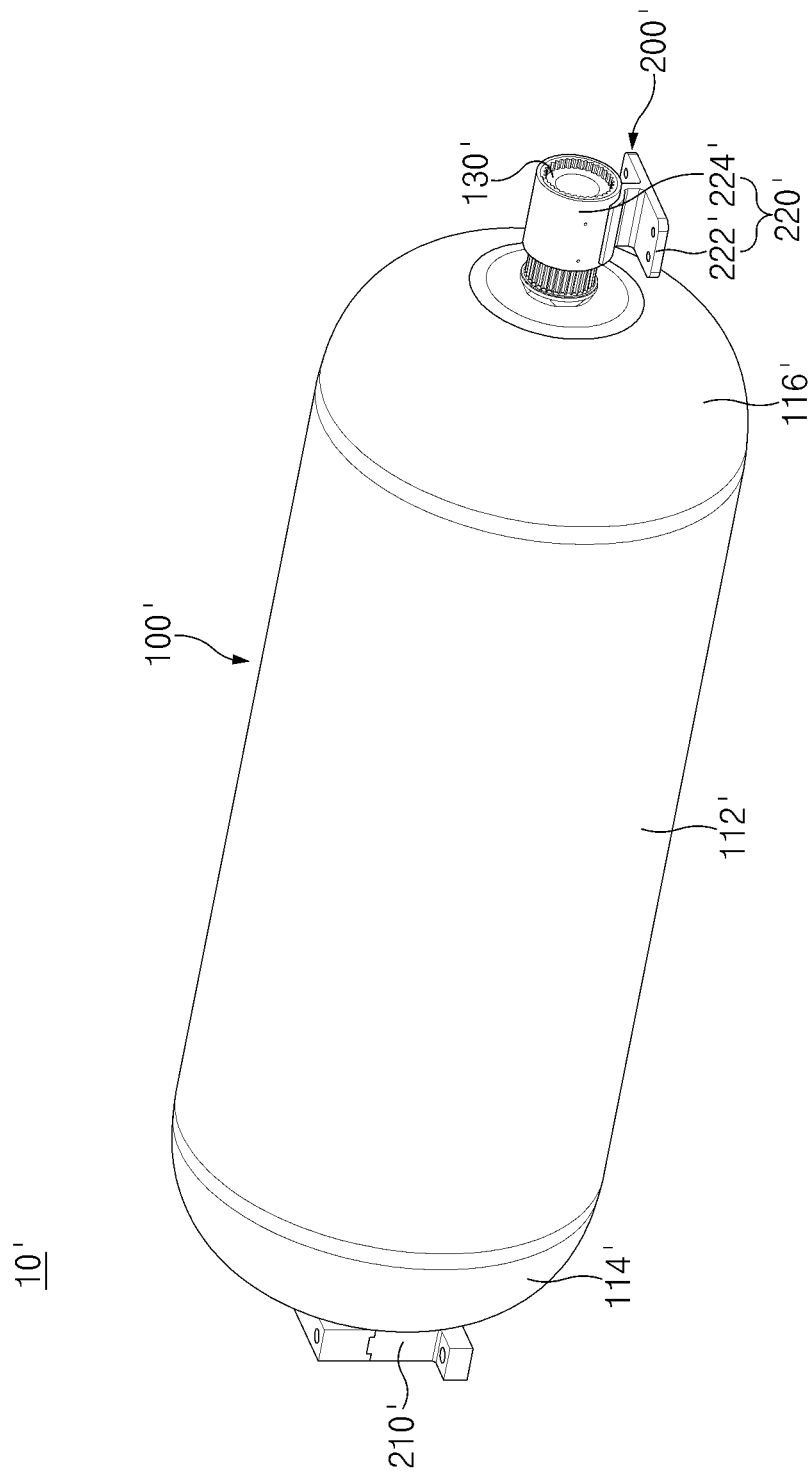
FIG. 5 is a view for explaining a pressure vessel assembly according to a second embodiment of the present disclosure.
Figure 6:
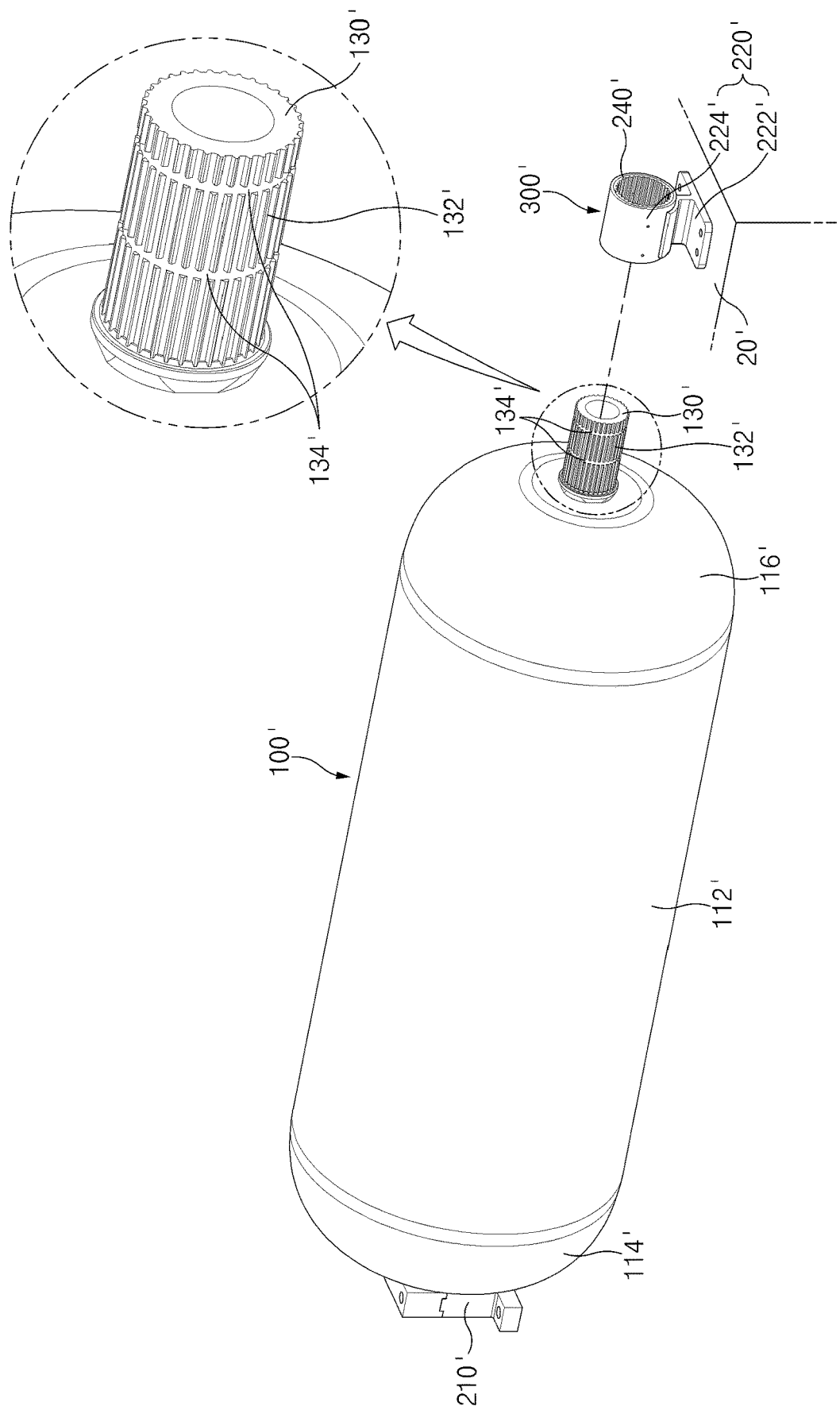
FIG. 6 is a view for explaining a pressure vessel fixing apparatus according to the second embodiment of the present disclosure.
Figure 7:
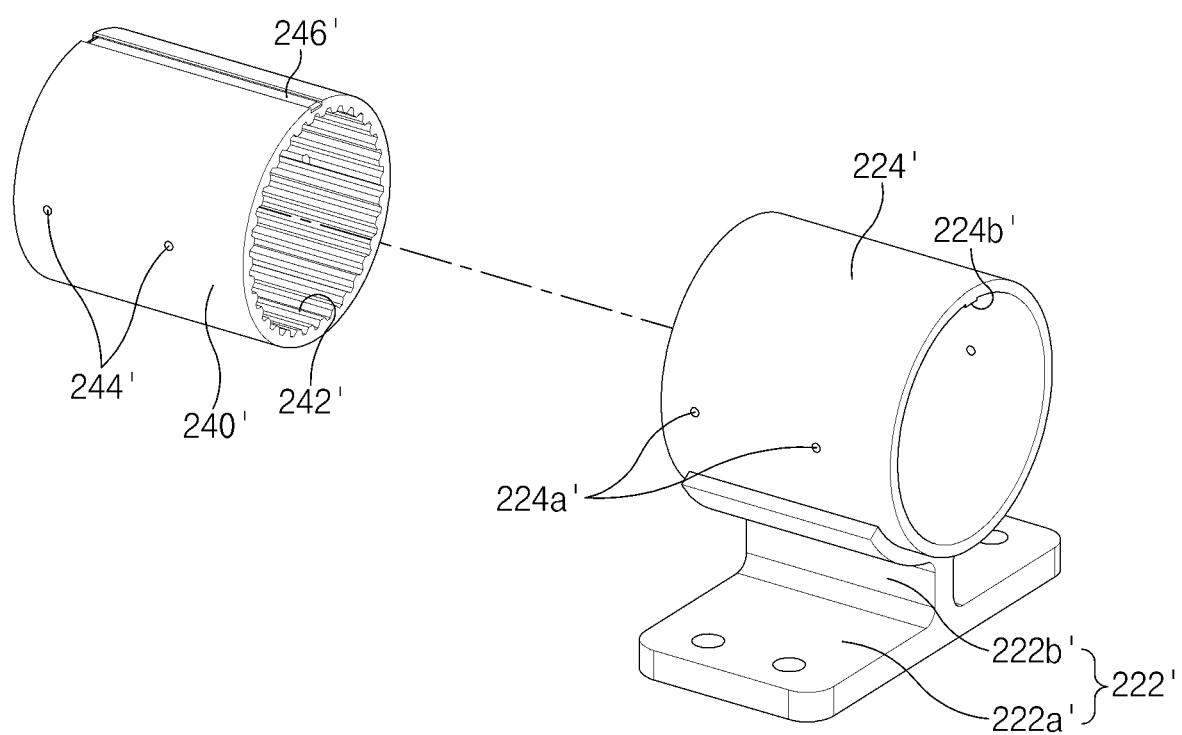
FIG. 7 is a view for explaining a serration pipe of the pressure vessel fixing apparatus according to the second embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element\

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Referring to FIGS. 1 to 4, a pressure vessel assembly 10 according to a first embodiment of the present disclosure includes: a pressure vessel 110 including a cylinder part 112, and side parts 114 and 116 provided at two opposite ends of the cylinder part 112 and each having a dome shape; nozzle members 120 respectively provided on the side parts 114 and 116; and protectors 200 respectively connected to the nozzle members 120 and configured to surround outer surfaces of the side parts 114 and 116.

For reference, the pressure vessel assembly 10 according to the first embodiment of the present disclosure may be used to store a high-pressure fluid (liquid or gas). The present disclosure is not restricted or limited by the type and the properties of the fluid stored in the pressure vessel 110.

Hereinafter, an example will be described in which the pressure vessel assembly 10 according to the first embodiment of the present disclosure is used as a hydrogen tank for a hydrogen storage system applied to mobility vehicles such as various fuel cell vehicles (e.g., a truck), ships, and aircrafts to which a fuel cell stack may be applied.

The pressure vessel 110 may store a high-pressure fluid (e.g., hydrogen) therein.

For example, the pressure vessel 110 may include a liner (not illustrated), a carbon fiber layer (not illustrated) configured to surround an outer surface of the liner, and a fiberglass layer (not illustrated) configured to surround an outer surface of the carbon fiber layer. The pressure vessel 110 may be selectively expanded or contracted depending on a pressure of hydrogen stored in the pressure vessel 110.

More specifically, the pressure vessel 110 includes the cylinder part 112, the side parts 114 and 116 provided at the two opposite ends of the cylinder part 112 and each having a dome shape, and the nozzle members 120 respectively provided on the side parts 114 and 116.

The cylinder part 112 may have an approximately hollow cylindrical shape. The first side part 114 having a dome shape is integrally provided at one end of the cylinder part 112. The second side part 116 having a dome shape is integrally provided at the other end of the cylinder part 112.

The nozzle members 120 are configured to close the ends of the side parts 114 and 116 (the first side part and the second side part). The nozzle member 120 may have a nozzle hole (not illustrated) for connecting various types of components such as valves and pipes.

The nozzle member 120 may be made of various materials in accordance with required conditions and design specifications. The present disclosure is not restricted or limited by the material of the nozzle member 120. For example, the nozzle member 120 may be made of a typical metallic or plastic material.

For reference, in the first embodiment of the present disclosure illustrated and described above, the example is described in which the nozzle members 120 are respectively provided at the two opposite ends of the pressure vessel 110. However, according to another example of the first embodiment of the present disclosure, the nozzle member may be provided only at any one of the two opposite ends (any one of the first and second side parts) of the pressure vessel.

According to the first exemplary embodiment of the present disclosure, the pressure vessel assembly 10 may include a support member 300 configured to support the nozzle member 120 on an object.

According to the first exemplary embodiment of the present disclosure, the support member 300 is configured to support the nozzle member 120 on an object (e.g., a vehicle body of a truck). The support member 300 may be configured to move (rectilinearly move) relative to the nozzle member 120 along a non-screw thread portion 124, which is defined on an outer peripheral surface of the nozzle member 120, in a longitudinal direction of the pressure vessel 110 (a leftward/rightward direction based on FIG. 1).

The support member 300 may have various structures capable of supporting the nozzle member 120 and moving relative to the nozzle member 120. The present disclosure is not restricted or limited by the structure and shape of the support member 300.

For example, the support member 300 may include a first bracket block (not illustrated) configured to surround one partial section of the outer peripheral surface of the nozzle member 120, and a second bracket block (not illustrated) provided to surround the other partial section of the outer peripheral surface of the nozzle member 120 so that the first and second bracket blocks collectively support the nozzle member 120. The nozzle member 120 may be rectilinearly movably accommodated in an accommodation hole (not illustrated) defined between the first and second bracket blocks.

The protectors 200 are respectively connected to the nozzle members 120 and cover the outer surfaces of the side parts 114 and 116.

This is based on the fact that because of the structural characteristics of the two opposite dome-shaped side parts 114 and 116 of the pressure vessel 110, it is difficult to wind a carbon fiber composite material with a sufficient thickness around the side parts 114 and 116 of the pressure vessel 110, which makes it difficult to ensure sufficient structural rigidity of the side parts 114 and 116 of the pressure vessel 110. Because the protectors 200 are configured to cover the outer surfaces of the side parts 114 and 116, it is possible to obtain an advantageous effect of ensuring structural rigidity of the side parts 114 and 116, minimizing impact to be transmitted to the pressure vessel 110 in case of the occurrence of impact caused by an accident or the like, and minimizing damage to and breakage of the pressure vessel 110.

The protector 200 may have various structures capable of surrounding the outer surface of each of the side parts 114 and 116. The present disclosure is not restricted or limited by the structure and shape of the protector 200.

In particular, the protector 200 may have a dome shape corresponding to each of the side parts 114 and 116 and surround the entire outer surface of each of the side parts 114 and 116. According to another example of the first embodiment of the present disclosure, the protector may be configured to partially surround the outer surface of the side part.

According to the first exemplary embodiment of the present disclosure, the protector 200 may include: a protector body 210 connected to the nozzle member 120 and configured to cover the outer surface of each of the side parts 114 and 116; and an elastic layer 220 provided on the protector body 210 and configured to come into contact with the outer surface of each of the side parts 114 and 116.

The protector body 210 is configured to primarily suppress (block) the impact that may be applied to the pressure vessel 110.

For example, the protector body 210 may have a dome shape corresponding to each of the side parts 114 and 116 and surround the outer surface of each of the side parts 114 and 116.

In particular, the protector body 210 may be made of a material having relatively higher rigidity (strength) than a material of the pressure vessel 110. For example, the protector body 210 may be made of steel.

According to the first exemplary embodiment of the present disclosure, an exposure hole 212 (e.g., a circular hole) may be provided through an approximately central portion of the protector body 210. The nozzle member 120 may pass through the exposure hole 212 and then be exposed to the outside of the protector 200.

According to another example of the first embodiment of the present disclosure, the protector body may be constituted by two or more protector members (not illustrated) coupled (assembled) to collectively surround a periphery of the nozzle member.

The protector body 210 may be connected to the nozzle members 120 in various ways in accordance with required conditions and design specifications.

For example, the pressure vessel assembly 10 may include: a first screw thread portion 122 provided on the outer peripheral surface of the nozzle member 120; and a second screw thread portion 218 provided on an inner wall surface of the exposure hole 212 and configured to be screw-fastened to the first screw thread portion 122. When the second screw thread portion 218 is screw-fastened to the first screw thread portion 122, the protector body 210 may be fixed to the nozzle member 120.

According to the first exemplary embodiment of the present disclosure, the first screw thread portion 122 may be partially provided at the end of the nozzle member 120 disposed adjacent to the cylinder part 112.

As described above, the first screw thread portion 122 is partially provided at the end of the nozzle member 120 disposed adjacent to the cylinder part 112, and the remaining section of the nozzle member 120 is defined as the non-screw thread portion 124. Therefore, it is possible to fasten the protector body 210 to the nozzle member 120 while ensuring the rectilinear movement of the support member 300 relative to the nozzle member 120 (allowing the support member 300 to rectilinearly move relative to the nozzle member 120 only in the section of the non-screw thread portion 124 of the nozzle member 120).

According to another example of the first embodiment of the present disclosure, the first screw thread portion may be provided on the entire nozzle member in a longitudinal direction of the nozzle member.

According to the first exemplary embodiment of the present disclosure, a tool seat portion 216 may be provided on the protector body 210 and configured to be fastened to a fastening tool.

The tool seat portion 216 may be provided to inhibit a slip of a fastening tool (e.g., a wrench) and ensure a smooth rotation of the protector body 210 (a rotation by the fastening tool).

For example, the tool seat portion 216 may be configured by providing a plurality of flat surfaces on an outer peripheral surface of a boss portion (not illustrated) provided on an approximately central portion of the protector body 210. For example, the tool seat portion 216 may have an approximately hexagonal cross-sectional shape made by removing (e.g., cutting) a part of the outer peripheral surface of the boss portion.

The elastic layer 220 is provided on the protector body 210 and configured to come into contact with the outer surface of each of the side parts 114 and 116. The elastic layer 220 and the protector body 210 collectively protect the pressure vessel 110 (the side part of the pressure vessel) from external impact.

The elastic layer 220 may have various structures capable of coming into contact with the outer surface of each of the side parts 114 and 116. The present disclosure is not restricted or limited by the structure and shape of the elastic layer 220.

For example, the elastic layer 220 may be integrated with the protector 200 by injection molding (dual injection molding) so as to cover the surface of the protector body 210. According to another example of the first embodiment of the present disclosure, the elastic layer may be attached or coupled to the surface of the protector body.

In this case, the configuration in which the elastic layer 220 covers the surface of the protector body 210 may be understood as a configuration in which the elastic layer 220 is provided on at least any one of an outer surface of the protector body 210 and an inner surface of the protector body 210 that faces the outer surface of each of the side parts 114 and 116. Hereinafter, an example will be described in which the elastic layers 220 are provided on both the inner and outer surfaces of the protector body 210.

The elastic layer 220 may be made of various materials capable of absorbing impact applied to the protector 200 (mitigating stress concentration). The present disclosure is not restricted or limited by the material and properties of the elastic layer 220.

For example, the elastic layer 220 may be made of rubber, silicone, or urethane. Alternatively, the elastic layer 220 may be made of synthetic resin capable of absorbing impact.

According to the first exemplary embodiment of the present disclosure, the pressure vessel assembly 10 may include first through-holes 214 provided in the protector body 210 and disposed adjacent to the exposure hole 212, and the first through-holes 214 may be exposed to the outside of the elastic layer 220.

The first through-hole 214 may have various structures and shapes in accordance with required conditions and design specifications. The present disclosure is not restricted or limited by the structure and shape of the first through-hole 214.

For example, the first through-hole 214 may be provided in the form of a long hole having a length larger than a width. The first through-hole 214 may be provided in plural, and the plurality of first through-holes 214 may be radially disposed around the exposure hole 212 and spaced apart from one another.

Because the first through-holes 214 are provided in the protector body 210 as described above, it is possible to reduce an overall weight of the protector 200.

According to the first exemplary embodiment of the present disclosure, the pressure vessel assembly 10 may include second through-holes 215 provided in the protector body 210 and spaced apart from the first through-holes 214, and the elastic layer 220 may fill the second through-holes 215.

The second through-hole 215 may have various structures and shapes in accordance with required conditions and design specifications. The present disclosure is not restricted or limited by the structure and shape of the second through-hole 215.

For example, the second through-hole 215 may be provided in the form of a long hole having a length larger than a width. The second through-hole 215 may be provided in plural, and the plurality of second through-holes 215 may be radially disposed around the exposure hole 212 and spaced apart from one another.

Because the second through-holes 215 are provided in the protector body 210 as described above, it is possible to further reduce an overall weight of the protector 200.

Moreover, the elastic layers 220 may be provided on the inner and outer surfaces of the protector body 210 while filling the second through-holes 215 (an inner surface elastic layer portion provided on the inner surface of the protector body and an outer surface elastic layer portion provided on the outer surface of the protector body may be integrally connected by means of a connection elastic layer portion that fills the second through-hole). Therefore, it is possible to obtain an advantageous effect of more securely maintaining the arrangement state of the elastic layer 220 with respect to the protector body 210 and minimizing the separation and deformation of the elastic layer 220.

According to the first embodiment of the present disclosure described above, it is possible to obtain an advantageous effect of inhibiting damage to and breakage of the pressure vessel and improving safety and reliability of the pressure vessel.

In particular, according to the first embodiment of the present disclosure, it is possible to obtain an advantageous effect of ensuring the structural rigidity of the side part of the pressure vessel and improving the durability.

In addition, according to the first embodiment of the present disclosure, it is possible to obtain an advantageous effect of reducing the impact to be transmitted to the pressure vessel in case of the occurrence of impact caused by an accident or the like.

Referring to FIGS. 5 to 8, a pressure vessel fixing apparatus 200' according to a second embodiment of the present disclosure serves to fix a pressure vessel 100' to an object 20', and the pressure vessel 100' includes a vessel main body 110', and nozzle members 120' and 130' respectively provided at ends of the vessel main body 110'. The pressure vessel fixing apparatus 200' includes: support members 210' and 220' configured to be movable in a longitudinal direction of the vessel main body 110' relative to the nozzle members and support the nozzle members 120' and 130' on the object 20'; and molding layers 230' respectively provided between the support members 210' and 220' and the nozzle members 120' and 130' and configured to temporarily restrain the support members 210' and 220' with respect to the nozzle members 120' and 130'.

Hereinafter, an example will be described in which the vessel main body 110', the pressure vessel fixing apparatus 200' including the support members, and the pressure vessel 100' collectively constitute a pressure vessel assembly 10'.

For reference, the pressure vessel fixing apparatus 200' according to the second embodiment of the present disclosure may be used to fix the pressure vessel 100' to various objects 20'. The present disclosure is not restricted or limited by the type and structure of the object 20' to which the pressure vessel 100' is fixed.

For example, the pressure vessel fixing apparatus 200' according to the second embodiment of the present disclosure may be used to fix the pressure vessel 100' to an outer portion of a vehicle (e.g., a truck).

The pressure vessel 100' may store a high-pressure fluid (liquid or gas, e.g., hydrogen) therein.

For example, the pressure vessel 100' may include a liner (not illustrated), a carbon fiber layer (not illustrated) configured to surround an outer surface of the liner, and a fiberglass layer (not illustrated) configured to surround an outer surface of the carbon fiber layer. The pressure vessel 100' may be selectively expanded or contracted depending on a pressure of hydrogen stored in the pressure vessel 100'.

More specifically, the pressure vessel 100' includes the vessel main body 110', and the nozzle members 120' and 130' respectively provided at the ends of the vessel main body 110'.

Hereinafter, an example will be described in which the pressure vessel 100' includes the first nozzle member 120' provided at one end (a left end based on FIG. 8) of the vessel main body 110', and the second nozzle member 130' provided at the other end (a right end based on FIG. 8) of the vessel main body 110'.

The vessel main body 110' may have various structures and shapes capable of storing a fluid (hydrogen). The present disclosure is not restricted or limited by the structure and shape of the vessel main body 110'.

For example, the pressure vessel 100' may include: a cylinder part 112' having a hollow cylindrical shape, a first side part 114' having a dome shape and integrated with one end of the cylinder part 112', and a second side part 116' having a dome shape and integrated with the other end of the cylinder part 112'.

The first nozzle member 120' may be provided on the first side part 114' and supported on the first support member 210' while closing one end (e.g., the left end based on FIG. 5) of the vessel main body 110'. The first nozzle member 120' may have a nozzle hole (not illustrated) for connecting various types of components such as valves and pipes.

The first nozzle member 120' may be variously changed in material in accordance with required conditions and design specifications. For example, the first nozzle member 120' may be made of a typical metallic or plastic material.

The second nozzle member 130' may be provided on the second side part 116' and supported on the second support member 220' while closing the other end (e.g., the right end based on FIG. 5) of the vessel main body 110'. The second nozzle member 130' may have a nozzle hole (not illustrated) for connecting various types of components 300' such as valves and pipes.

The second nozzle member 130' may be variously changed in material in accordance with required conditions and design specifications. For example, the second nozzle member 130' may be made of a typical metallic or plastic material.

For reference, in the second embodiment of the present disclosure illustrated and described above, the example has been described in which the first nozzle member 120' and the second nozzle member 130' are respectively provided at the two opposite ends of the vessel main body 110'. However, according to another example of the second embodiment of the present disclosure, the nozzle member may be provided only at any one of the two opposite ends of the vessel main body.

In addition, in the second embodiment of the present disclosure, the example has been described in which the first nozzle member 120' and the second nozzle member 130' each have the nozzle holes for connecting the components such as valves and pipes. However, according to another example of the second embodiment of the present disclosure, the nozzle hole may be provided only in any one of the first nozzle member and the second nozzle member.

The support members 210' and 220' are provided to support the nozzle members 120' and 130' on the object 20' (e.g., a vehicle body of a truck).

Hereinafter, the example will be described in which the pressure vessel fixing apparatus 200' includes the first support member 210' configured to support the first nozzle member 120', and the second support member 220' configured to support the second nozzle member 130'.

The first support member 210' is provided to support the first nozzle member 120' on the object 20' (e.g., the vehicle body of the truck). The first support member 210' may move (rectilinearly move) relative to the first nozzle member 120' in the longitudinal direction of the vessel main body 110' (in the leftward/rightward direction based on FIG. 5).

The first support member 210' may have various structures capable of supporting the first nozzle member 120' and moving relative to the first nozzle member 120'. The present disclosure is not restricted or limited by the structure and shape of the first support member 210'.

For example, the first support member 210' may include a first bracket block (not illustrated) provided to surround one partial section of the outer peripheral surface of the first nozzle member 120', and a second bracket block (not illustrated) provided to surround the other partial section of the outer peripheral surface of the first nozzle member 120' so that the first and second bracket blocks collectively support the first nozzle member 120'. The first nozzle member 120' may be rectilinearly movably accommodated in an accommodation hole (not illustrated) defined between the first and second bracket blocks.

The second support member 220' is provided to support the second nozzle member 130' on the object 20' (e.g., the vehicle body of the truck). The second support member 220' may move (rectilinearly move) relative to the second nozzle member 130' in the longitudinal direction of the vessel main body 110' (in the leftward/rightward direction based on FIG. 5).

The second support member 220' may have various structures capable of supporting the second nozzle member 130' and moving relative to the second nozzle member 130'. The present disclosure is not restricted or limited by the structure and shape of the second support member 220'.

For example, the second support member 220' may include a base frame portion 222' supported on the object 20', and a support frame portion 224' connected to the base frame portion 222' and configured to surround the second nozzle member 130'.

The base frame portion 222' is provided to support the support frame portion 224' on the object 20'. The base frame portion 222' may be variously changed in structure and shape in accordance with required conditions and design specifications.

According to the second exemplary embodiment of the present disclosure, the base frame portion 222' may include a first frame portion 222a' supported on the object 20', and a second frame portion 222b' connected to the first frame portion 222a' and connected to the support frame portion 224'.

The first frame portion 222a' may be variously changed in structure and shape in accordance with required conditions and design specifications.

For example, the first frame portion 222a' may be provided in the form of an approximately flat plate and be fixed to the object 20' (e.g., the vehicle body) by using a typical fastening member (e.g., a bolt or a pin). According to another example of the second embodiment of the present disclosure, the first frame portion may be provided in the form of a block or column. Alternatively, the base frame portion may slide on the object in the longitudinal direction of the vessel main body.

The second frame portion 222b' may be variously changed in structure and shape in accordance with required conditions and design specifications. The present disclosure is not restricted or limited by the structure and shape of the second frame portion 222b'.

For example, the second frame portion 222b' may be provided in the form of an approximately flat plate. The second frame portion 222b' may be integrally connected to an approximately central portion of the first frame portion 222a' and disposed to be perpendicular to the first frame portion 222a'.

With the above-mentioned structure, when impact is applied to the support frame portion 224', the second frame portion 222b' is deformed (bent) with respect to the first frame portion 222a', such that the support frame portion 224' may move relative to the second nozzle member 130'.

According to another example of the second embodiment of the present disclosure, the first and second frame portions collectively define an "L" shape, an "S" shape, a "V" shape, or other shapes.

The support frame portion 224' may be variously changed in structure and shape in accordance with required conditions and design specifications. The present disclosure is not restricted or limited by the structure and shape of the support frame portion 224'.

For example, the support frame portion 224' may have an approximately hollow cylindrical shape having an accommodation space therein. The support frame portion 224' may be integrally coupled to an end (free end) of the second frame portion 222b', and the second nozzle member 130' may be rectilinearly movably accommodated in the accommodation space of the support frame portion 224'.

In particular, a curved seating portion (not illustrated) may be provided at an end of the second frame portion 222b', and the support frame portion 224' may be seated on and in close contact with the curved seating portion.

For example, the support frame portion 224' may be connected to the base frame portion (e.g., the second frame portion) by welding. According to another example of the second embodiment of the present disclosure, the support frame portion and the base frame portion may be provided as a unitary one-piece structure.

As described above, according to the second embodiment of the present disclosure, not only the first support member 210' for supporting the first nozzle member 120' of the pressure vessel 100' moves relative to the pressure vessel 100', but also the second support member 220' for supporting the second nozzle member 130' of the pressure vessel 100' moves relative to the pressure vessel 100', which makes it possible to effectively absorb the displacement made by the expansion and contraction of the pressure vessel 100'.

Moreover, when impact (e.g., impact caused by a rollover accident of the vehicle) is applied to the first nozzle member 120' or the second support member 220', the first nozzle member 120' and the second support member 220' may rectilinearly move in a direction toward the pressure vessel 100' (the longitudinal direction of the pressure vessel). Therefore, it is possible to obtain an advantageous effect of minimizing impact transmitted to the pressure vessel 100' through the first nozzle member 120' and the second support member 220' and minimizing the damage to and breakage of the pressure vessel 100'.

Meanwhile, in the second embodiment of the present disclosure illustrated and described above, the example has been described in which the first support member 210' and the second support member 220' have different structures. However, according to another example of the second embodiment of the present disclosure, the first support member and the second support member may have the same structure.

Figure 8:
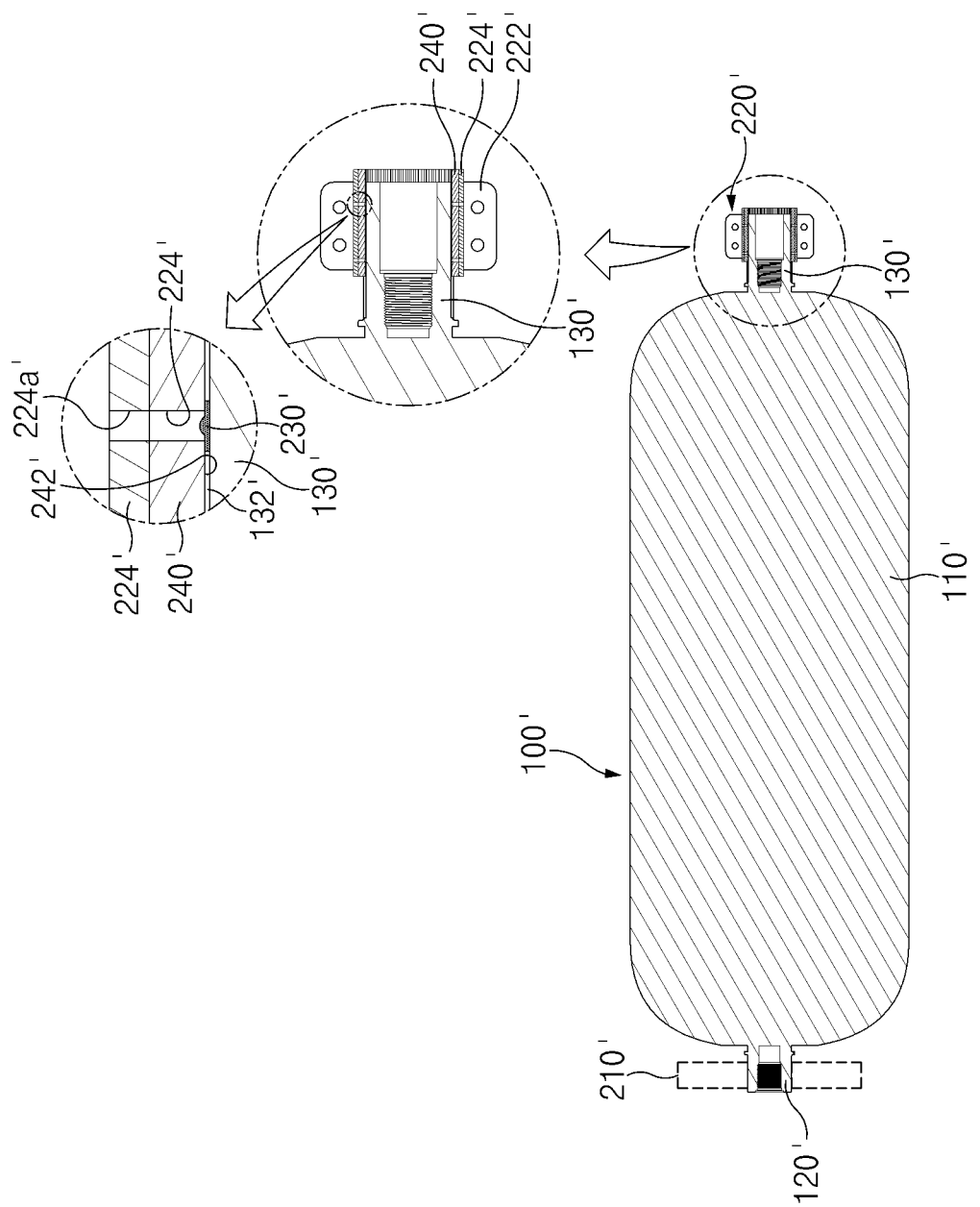
FIG. 8 is a view for explaining a molding layer of the pressure vessel fixing apparatus according to the second embodiment of the present disclosure.
Figure 9:
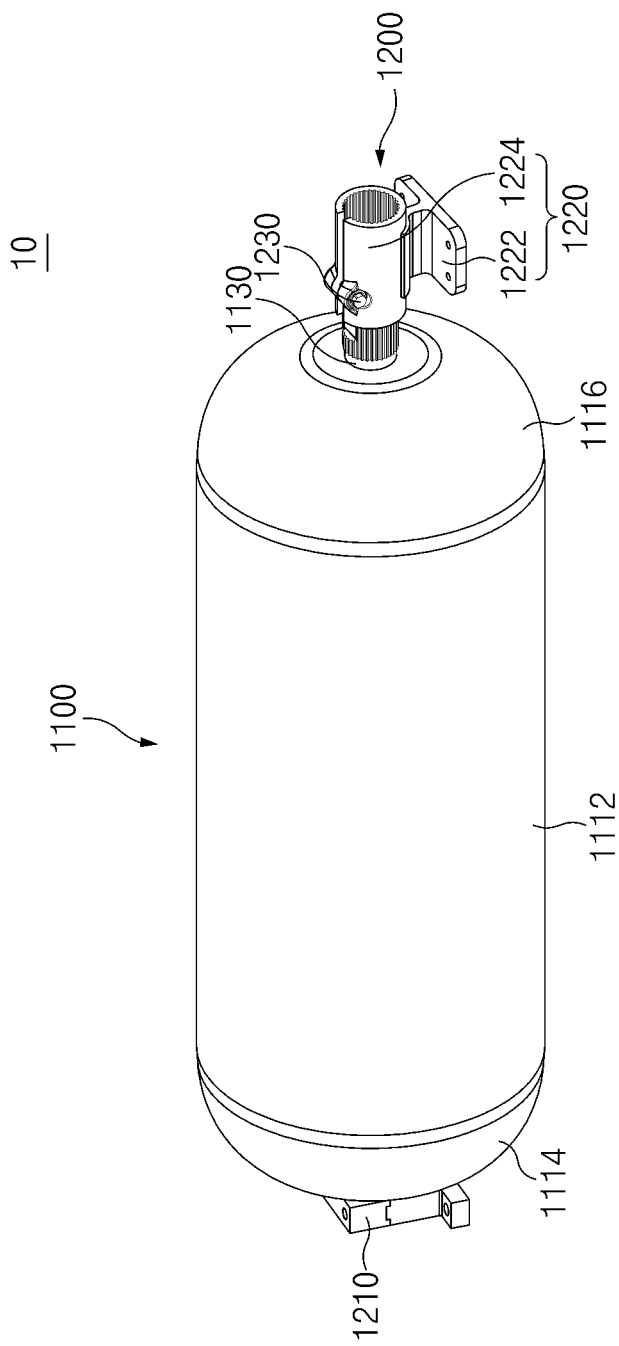
FIG. 9 is a view for explaining a pressure vessel assembly according to a third embodiment of the present disclosure.

Referring to FIG. 8, the molding layers 230' are respectively provided between the support members 210' and 220' and the nozzle members 120' and 130' to temporarily restrain the support members 210' and 220' with respect to the nozzle members.

In this case, the configuration in which the molding layers 230' are respectively provided between the nozzle members 120' and 130' and the support members 210' and 220' may be understood as a configuration in which the molding layers 230' are respectively disposed in gaps between the nozzle members 120' and 130' and the support members 210' and 220' while being in close contact with the nozzle members 120' and 130' and the support members 210' and 220'. The nozzle members 120' and 130' and the support members 210' and 220' may be temporarily fixed (restrained) by the molding layers 230'.

For example, the molding layer 230' may be provided between the support frame portion 224' and the nozzle member to temporarily restrain the second support member 220' with respect to the second nozzle member 130'.

As described above, the molding layer 230' is provided between the second nozzle member 130' and the second support member 220', and the second nozzle member 130' and the second support member 220' are restrained by the molding layer 230'. Therefore, it is possible to obtain an advantageous effect of stably maintaining the arrangement state of the second support member 220' with respect to the second nozzle member 130' and inhibiting the abnormal movement of the second support member 220' relative to the second nozzle member 130'.

In particular, when impact energy higher than preset reference impact energy (e.g., breaking strength of the molding layer) is applied to the second support member 220', the molding layer 230' is broken (fractured), such that the movement (rectilinear movement) of the support member relative to the nozzle member may be allowed.

In this case, the rigidity (rigidity corresponding to the reference impact energy) of the molding layer 230' may be variously changed in accordance with required conditions and design specifications. The present disclosure is not restricted or limited by the rigidity of the molding layer 230'. For reference, the rigidity of the molding layer 230' may be adjusted by changing the material or structure of the molding layer 230'.

Therefore, in a normal use state (a state in which no impact occurs), the arrangement state of the second support member 220' with respect to the second nozzle member 130' may be restrained (fixed) by a restrictive force made by the molding layer 230'.

In contrast, when an impact force (impact energy) higher than a restrictive force (e.g., a shearing force of the molding layer) is applied to the second support member 220', the molding layer 230' is broken, and the second support member 220' moves in a direction toward the vessel main body 110', such that the impact force applied to the second support member 220' may be mitigated (absorbed). As a result, it is possible to minimize an impact force P to be transmitted to the pressure vessel 100' through the second nozzle member 130'.

The molding layer 230' may be provided in various ways in accordance with required conditions and design specifications. The present disclosure is not restricted or limited by the method and order of providing the molding layer 230'.

According to the second exemplary embodiment of the present disclosure, the pressure vessel fixing apparatus 200' may include injection holes 224a' respectively provided in the support members 210' and 220' (e.g., the second support member), and filling grooves 134' respectively provided in the outer surfaces of the nozzle members 120' and 130' (e.g., the second nozzle member) and configured to communicate with the injection holes 224a'. The molding layer 230' may be provided by curing a filling material introduced into the filling grooves 134' through the injection holes 224a'.

More specifically, a melted filling material may be injected through the injection hole 224a', such that the filling groove 134' may be filled with the filling material. The filling material with which the filling grooves 134' are filled is cured (solidified), such that the molding layers 230' may be provided between the inner surface of the support frame portion 224' and the outer surfaces of the nozzle members 120' and 130' while being in close contact with the inner surface of the support frame portion 224' and the outer surfaces of the nozzle members 120' and 130'.

Various filling materials may be used as the filling material (e.g., resin) for providing the molding layer 230' in accordance with required conditions and design specifications. The present disclosure is not restricted or limited by the type and properties of the filling material.

In particular, the filling groove 134' may be provided in the form of a ring continuously formed in a circumferential direction of the second nozzle member 130'.

As described above, according to the second embodiment of the present disclosure, because the filling groove 134' is provided in the form of a ring continuously formed in the circumferential direction of the second nozzle member 130', the molding layer 230' provided along the filling groove 134' may also be provided in the form of a continuous ring. Therefore, the restrictive force made by the molding layer 230' may be entirely and uniformly distributed in the circumferential direction of the second nozzle member 130'.

Hereinafter, an example will be described in which a plurality of filling grooves 134' each having a ring shape is provided in the outer surface of the second nozzle member 130' and spaced apart from one another in a longitudinal direction of the second nozzle member 130'. Alternatively, only a single filling groove or three or more filling grooves may be provided in the outer surface of the second nozzle member.

According to another example of the second embodiment of the present disclosure, the plurality of filling grooves may be provided to be spaced apart from one another in the circumferential direction of the second nozzle member, and the molding layers may be respectively provided in the plurality of filling grooves.

According to the second exemplary embodiment of the present disclosure, the pressure vessel fixing apparatus 200' may include: serration protrusions 132' provided on the outer surfaces of the nozzle members 120' and 130' (e.g., the second nozzle member) in the longitudinal direction of the vessel main body 110'; and a serration pipe 240' accommodated in the support frame portion 224' and having serration grooves 242' that accommodate the serration protrusions 132'. The molding layers 230' may be provided between the serration pipe 240' and the nozzle members 120' and 130' (e.g., the second nozzle member).

More specifically, the serration protrusion 132' is provided on the outer surface of the second nozzle member 130' and has a straight shape in the longitudinal direction of the vessel main body 110'. The serration protrusion 132' may be provided in plural, and the plurality of serration protrusions 132' is spaced apart from one another in the circumferential direction of the second nozzle member 130'.

The serration pipe 240' has an approximately hollow cylindrical shape and is accommodated in the support frame portion 224'. The serration grooves 242' are provided on an inner peripheral surface of the serration pipe 240' and correspond to the serration protrusions 132'. The serration protrusions 132' may engage with the serration grooves 242' in the state in which the second nozzle member 130' is accommodated in the support frame portion 224'.

As described above, according to the second embodiment of the present disclosure, the serration protrusions 132' engage with the serration grooves 242' in the state in which the second nozzle member 130' is supported on the second support member 220'. Therefore, it is possible to inhibit the abnormal rotation of the pressure vessel 100' relative to the second support member 220' while allowing the rectilinear movement (the rectilinear movement in the longitudinal direction of the pressure vessel) of the second support member 220' relative to the second nozzle member 130'. Therefore, it is possible to obtain an advantageous effect of more stably maintaining the arrangement state of the pressure vessel 100' and inhibiting the withdrawal of valves and pipes caused by the abnormal rotation of the pressure vessel 100'.

In addition, the serration pipe 240' may have through-holes 244' that communicate with the injection holes 224a' and the filling grooves 134'. The filling material injected into the injection holes 224a' may be introduced into the filling grooves 134' through the through-holes 244', such that the molding layer 230' may be provided.

In particular, the pressure vessel fixing apparatus 200' may include: a reference protrusion 224b' provided in an inner surface of the support frame portion 224'; and a reference groove 246' provided on an outer surface of the serration pipe 240' and corresponding to the reference protrusion 224b' such that the reference protrusion 224b' is accommodated in the reference groove 246'. When the reference protrusion 224b' is accommodated in the reference groove 246', the injection hole 224a' and the filling groove 134' may be aligned with each other to communicate with each other.

For example, the reference protrusion 224b' may have a straight shape in the longitudinal direction of the second nozzle member 130', and the reference groove 246' may have a shape corresponding to a shape of the reference protrusion 224b'.

As described above, the injection hole 224a' and the filling groove 134' are aligned with each other to communicate with each other at the same time when the reference protrusion 224b' is inserted into the reference groove 246'. Therefore, it is possible to obtain an advantageous effect of simplifying the process of aligning the injection hole 224a' and the filling groove 134' while inhibiting the serration pipe 240' from being erroneously assembled.

According to the second embodiment of the present disclosure described above, it is possible to obtain an advantageous effect of inhibiting damage to and breakage of the pressure vessel and improving safety and reliability of the pressure vessel.

In particular, according to the second embodiment of the present disclosure, it is possible to obtain an advantageous effect of minimizing the impact to be transmitted to the pressure vessel through the support member and minimizing the damage to and breakage of the pressure vessel.

In addition, according to the second embodiment of the present disclosure, it is possible to obtain an advantageous effect of stably ensuring the arrangement state of the pressure vessel in the normal use state (in the state in which no impact occurs) and reducing the impact to be transmitted to the pressure vessel in case of the occurrence of impact caused by an accident or the like.

In addition, according to the second embodiment of the present disclosure, it is possible to obtain an advantageous effect of improving the structural rigidity and durability.

In addition, according to the second embodiment of the present disclosure, it is possible to obtain an advantageous effect of minimizing an assembling defect caused by the manufacturing tolerance and assembling tolerance of the pressure vessel and improving the assembling properties and workability.

Referring to FIGS. 9 to 14, a pressure vessel fixing apparatus 1200 according to a third embodiment of the present disclosure serves to fix a pressure vessel 1100 to an object 20, and the pressure vessel 1100 includes a vessel main body 1110, and nozzle members 1120 and 1130 respectively provided at ends of the vessel main body 1110. The pressure vessel fixing apparatus 1200 includes: support members 1210 and 1220 configured to be movable in a longitudinal direction of the vessel main body 1110 relative to the nozzle member and support the nozzle members 1120 and 1130 on the object 20; and clamping members 1230 configured to provide a clamping force to the support members 1210 and 1220 so that the support members 1210 and 1220 are respectively in close contact with the nozzle members 1120 and 1130 and temporarily restrained with respect to the nozzle members 1120 and 1130.

Hereinafter, an example will be described in which the vessel main body 1110, the pressure vessel fixing apparatus 1200 including the support members, and the pressure vessel 1100 collectively constitute a pressure vessel assembly 10.

For reference, the pressure vessel fixing apparatus 1200 according to the third embodiment of the present disclosure may be used to fix the pressure vessel 1100 to various objects 20. The present disclosure is not restricted or limited by the type and structure of the object 20 to which the pressure vessel 1100 is fixed.

For example, the pressure vessel fixing apparatus 1200 according to the third embodiment of the present disclosure may be used to fix the pressure vessel 1100 to an outer portion of a vehicle (e.g., a truck).

The pressure vessel 1100 may store a high-pressure fluid (liquid or gas, e.g., hydrogen) therein.

For example, the pressure vessel 1100 may include a liner (not illustrated), a carbon fiber layer (not illustrated) configured to surround an outer surface of the liner, and a fiberglass layer (not illustrated) configured to surround an outer surface of the carbon fiber layer. The pressure vessel 1100 may be selectively expanded or contracted depending on a pressure of hydrogen stored in the pressure vessel 1100.

More specifically, the pressure vessel 1100 may include the vessel main body 1110, and the nozzle members 1120 and 1130 respectively provided at the ends of the vessel main body 1110.

Hereinafter, an example will be described in which the pressure vessel 1100 includes the first nozzle member 1120 provided at one end (a left end based on FIG. 12) of the vessel main body 1110, and the second nozzle member 1130 provided at the other end (a right end based on FIG. 12) of the vessel main body 1110.

The vessel main body 1110 may have various structures and shapes capable of storing a fluid (hydrogen). The present disclosure is not restricted or limited by the structure and shape of the vessel main body 1110.

For example, the pressure vessel 1100 may include: a cylinder part 1112 having a hollow cylindrical shape, a first side part 1114 having a dome shape and integrated with one end of the cylinder part 1112, and a second side part 1116 having a dome shape and integrated with the other end of the cylinder part 1112.

The first nozzle member 1120 may be provided on the first side part 1114 and supported on the first support member 1210 while closing one end (e.g., the left end based on FIG. 9) of the vessel main body 1110. The first nozzle member 1120 may have a nozzle hole (not illustrated) for connecting various types of components such as valves and pipes.

The first nozzle member 1120 may be variously changed in material in accordance with required conditions and design specifications. For example, the first nozzle member 1120 may be made of a typical metallic or plastic material.

The second nozzle member 1130 may be provided on the second side part 1116 and supported on the second support member 1220 while closing the other end (e.g., the right end based on FIG. 9) of the vessel main body 1110. The second nozzle member 1130 may have a nozzle hole (not illustrated) for connecting various types of components 1300 such as valves and pipes.

The second nozzle member 1130 may be variously changed in material in accordance with required conditions and design specifications. For example, the second nozzle member 1130 may be made of a typical metallic or plastic material.

For reference, in the third embodiment of the present disclosure illustrated and described above, the example has been described in which the first nozzle member 1120 and the second nozzle member 1130 are respectively provided at the two opposite ends of the vessel main body 1110. However, according to another example of the third embodiment of the present disclosure, the nozzle member may be provided only at any one of the two opposite ends of the vessel main body.

In addition, in the third embodiment of the present disclosure, the example has been described in which the first nozzle member 1120 and the second nozzle member 1130 each have the nozzle holes for connecting the components such as valves and pipes. However, according to another example of the third embodiment of the present disclosure, the nozzle hole may be provided only in any one of the first nozzle member and the second nozzle member.

The support members 1210 and 1220 are provided to support the nozzle members 1120 and 1130 on the object 20 (e.g., a vehicle body of a truck).

Hereinafter, the example will be described in which the pressure vessel fixing apparatus 1200 includes the first support member 1210 configured to support the first nozzle member 1120, and the second support member 1220 configured to support the second nozzle member 1130.

The first support member 1210 is provided to support the first nozzle member 1120 on the object 20 (e.g., the vehicle body of the truck). The first support member 1210 may move (rectilinearly move) relative to the first nozzle member 1120 in the longitudinal direction of the vessel main body 1110 (in the leftward/rightward direction based on FIG. 9).

The first support member 1210 may have various structures capable of supporting the first nozzle member 1120 and moving relative to the first nozzle member 1120. The present disclosure is not restricted or limited by the structure and shape of the first support member 1210.

For example, the first support member 1210 may include a first bracket block (not illustrated) provided to surround one partial section of the outer peripheral surface of the first nozzle member 1120, and a second bracket block (not illustrated) provided to surround the other partial section of the outer peripheral surface of the first nozzle member 1120 so that the first and second bracket blocks collectively support the first nozzle member 1120. The first nozzle member 1120 may be rectilinearly movably accommodated in an accommodation hole (not illustrated) defined between the first and second bracket blocks.

The second support member 1220 is provided to support the second nozzle member 1130 on the object 20 (e.g., the vehicle body of the truck). The second support member 220 may move (rectilinearly move) relative to the second nozzle member 1130 in the longitudinal direction of the vessel main body 1110 (in the leftward/rightward direction based on FIG. 9).

The second support member 1220 may have various structures capable of supporting the second nozzle member 1130 and moving relative to the second nozzle member 1130. The present disclosure is not restricted or limited by the structure and shape of the second support member 1220.

Figure 10:
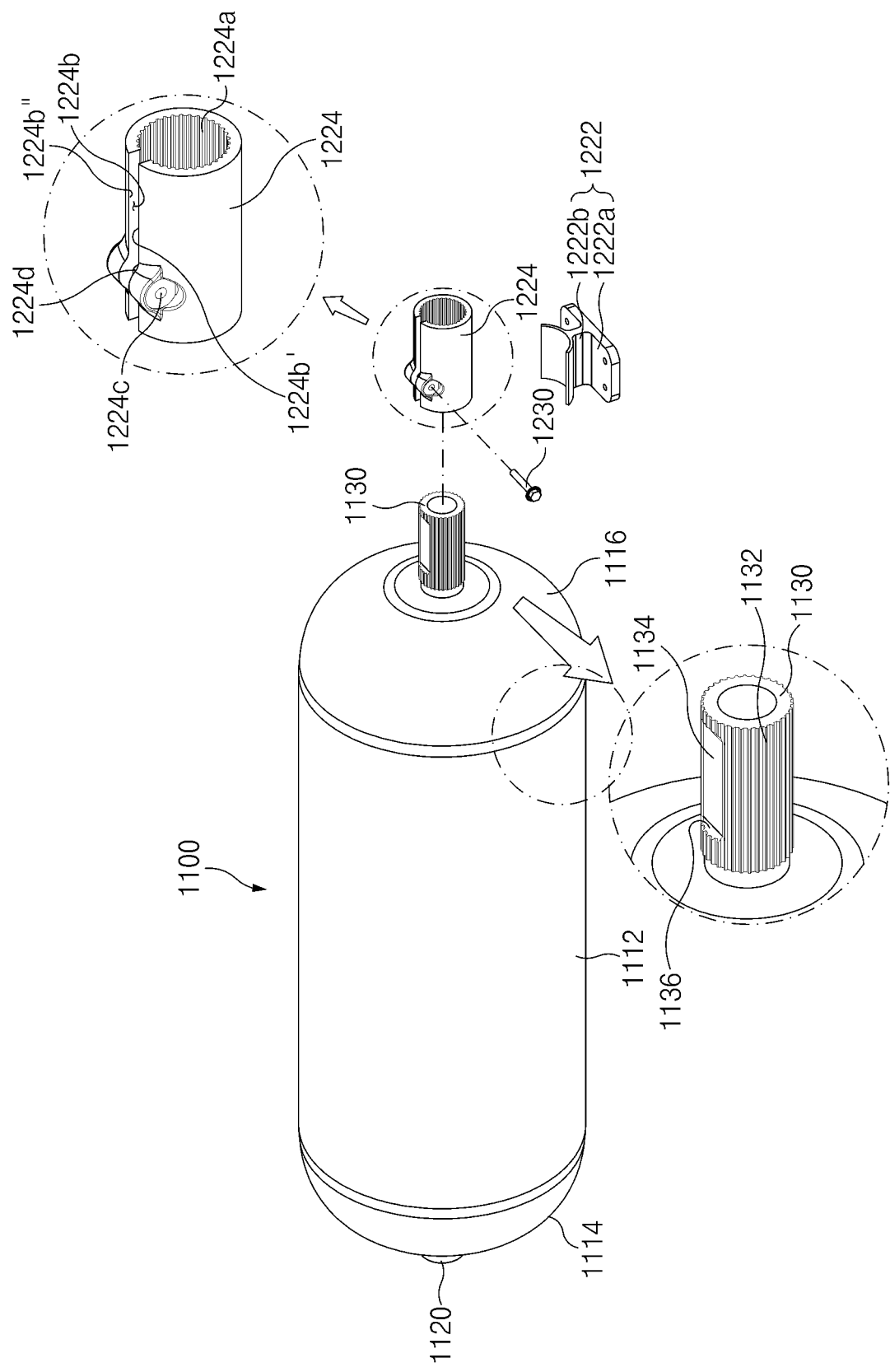
FIG. 10 is a view for explaining a pressure vessel fixing apparatus according to the third embodiment of the present disclosure.

For example, referring to FIG. 10, the second support member 1220 may include: a base frame portion 1222 supported on the object 20; and a support frame portion 1224 connected to the base frame portion 1222 so as to surround the second nozzle member 1130 and having a cut-out slit 1224b provided in the longitudinal direction of the vessel main body 1110.

The base frame portion 1222 is provided to support the support frame portion 1224 on the object 20. The base frame portion 1222 may be variously changed in structure and shape in accordance with required conditions and design specifications.

According to the third exemplary embodiment of the present disclosure, the base frame portion 1222 may include a first frame portion 1222a supported on the object 20, and a second frame portion 1222b connected to the first frame portion 1222a and connected to the support frame portion 1224.

The first frame portion 1222a may be variously changed in structure and shape in accordance with required conditions and design specifications.

For example, the first frame portion 1222a may be provided in the form of an approximately flat plate and be fixed to the object 20 (e.g., the vehicle body) by using a typical fastening member (e.g., a bolt or a pin). According to another example of the third embodiment of the present disclosure, the first frame portion may be provided in the form of a block or column. Alternatively, the base frame portion may slide on the object in the longitudinal direction of the vessel main body.

The second frame portion 1222b may be variously changed in structure and shape in accordance with required conditions and design specifications. The present disclosure is not restricted or limited by the structure and shape of the second frame portion 1222b.

For example, the second frame portion 1222b may be provided in the form of an approximately flat plate. The second frame portion 222b may be integrally connected to an approximately central portion of the first frame portion 1222a and disposed to be perpendicular to the first frame portion 1222a.

With the above-mentioned structure, when impact is applied to the support frame portion 1224, the second frame portion 1222b is deformed (bent) with respect to the first frame portion 1222a, such that the support frame portion 1224 may move relative to the second nozzle member 1130.

According to another example of the third embodiment of the present disclosure, the first and second frame portions collectively define an "L" shape, an "S" shape, a "V" shape, or other shapes.

The support frame portion 1224 may have various structures having the cut-out slit 1224b. The present disclosure is not restricted or limited by the structure and shape of the support frame portion 1224.

For example, the support frame portion 1224 may have an approximately hollow cylindrical shape having an accommodation space therein and configured to surround the second nozzle member 1130. The cut-out slit 1224*b* may be provided at an upper end (based on FIG. 10) of the support frame portion 1224 by entirely cutting the upper end of the support frame portion 1224 in the longitudinal direction of the support frame portion 1224.

Hereinafter, an example will be described in which the cut-out slit 1224*b* has a straight shape in the longitudinal direction of the support frame portion 1224. According to another example of the third embodiment of the present disclosure, the cut-out slit may have a curved shape (e.g., an S shape) or other shapes.

In the state in which the support frame portion 1224 is disposed to surround the second nozzle member 1130, one end 1224*b*' (one end in a circumferential direction of the support frame portion) of the support frame portion 1224 may move toward or away from the other end 1224*b*" (the other end in the circumferential direction of the support frame portion) of the support frame portion 1224. As one end 1224*b*' of the support frame portion 1224 moves toward or away from the other end 1224*b*" of the support frame portion 1224, the clamping force applied by the support frame portion 1224 to restrain the second nozzle member 1130 (the restrictive force applied by the support frame portion to restrain the second nozzle member) may be changed.

For reference, one end of the support frame portion 1224 may define a first inner wall surface of the cut-out slit 1224*b*, and the other end of the support frame portion 1224 may define a second inner wall surface of the cut-out slit 1224*b* that faces the first inner wall surface.

Further, in the third embodiment of the present disclosure, the configuration in which one end 1224*b*' of the support frame portion 1224 moves toward or away from the other end 1224*b*" of the support frame portion 1224 may be understood as a configuration in which the first inner wall surface (one end of the support frame portion) of the cut-out slit 1224*b* moves toward or away from the second inner wall surface (the other end of the support frame portion) of the cut-out slit 1224*b*.

In particular, a curved seating portion (not illustrated) may be provided at an end of the second frame portion 1222*b*, and the support frame portion 1224 may be seated on and in close contact with the curved seating portion.

For example, the support frame portion 1224 may be connected to the base frame portion (e.g., the second frame portion) by welding. According to another example of the third embodiment of the present disclosure, the support frame portion and the base frame portion may be provided as a unitary one-piece structure.

As described above, according to the third embodiment of the present disclosure, not only the first support member 1210 for supporting the first nozzle member 1120 of the pressure vessel 1100 moves relative to the pressure vessel 1100, but also the second support member 1220 for supporting the second nozzle member 1130 of the pressure vessel 1100 moves relative to the pressure vessel 1100, which makes it possible to effectively absorb the displacement made by the expansion and contraction of the pressure vessel 1100.

Moreover, when impact (e.g., impact caused by a rollover accident of the vehicle) is applied to the first nozzle member 1120 or the second support member 1220, the first nozzle member 1120 and the second support member 1220 may rectilinearly move in a direction toward the pressure vessel 1100 (the longitudinal direction of the pressure vessel). Therefore, it is possible to obtain an advantageous effect of minimizing impact transmitted to the pressure vessel 1100 through the first nozzle member 1120 and the second support member 1220 and minimizing the damage to and breakage of the pressure vessel 1100.

Meanwhile, in the third embodiment of the present disclosure illustrated and described above, the example has been described in which the first support member 1210 and the second support member 1220 have different structures. However, according to another example of the second embodiment of the present disclosure, the first support member and the second support member may have the same structure.

The clamping member 1230 is provided to provide the clamping force to the support member so that the support member is in close contact with the nozzle member and temporarily restrained with respect to the nozzle member.

In this case, the configuration in which the clamping member 1230 brings the support member (e.g., the second support member) into close contact with the nozzle member (e.g., the second nozzle member) may be understood as a configuration in which the support frame portion 1224 is tightened by the clamping member 1230, and an inner surface of the support frame portion 1224 comes into close contact with an outer surface of the second nozzle member 1130.

In particular, the clamping force applied to the second support member may be selectively increased or decreased (adjusted) by the clamping member 1230.

Further, a movement stroke of the support member relative to the nozzle member may be adjusted by the clamping force applied by the clamping member 1230. For example, when the clamping force applied by the clamping member 1230 increases, the movement stroke of the support member relative to the nozzle member may decrease. On the contrary, when the clamping force applied by the clamping member 1230 decreases, the movement stroke of the support member relative to the nozzle member may increase.

The clamping member 1230 may have various structures capable of providing the clamping force to the support member. The present disclosure is not restricted or limited by the type and structure of the clamping member 1230.

According to the third exemplary embodiment of the present disclosure, the pressure vessel fixing apparatus 1200 may include: a first screw fastening portion 1224*c* provided at one end 1224*b*' (e.g., one end of the support frame portion) of the support member based on the cut-out slit 1224*b*; and a second screw fastening portion 1224*d* provided at the other end 1224*b*" (e.g., the other end of the support frame portion) of the support member so as to face the first screw fastening portion 1224*c*. The clamping member 1230 may be screw-fastened to the first screw fastening portion 1224*c* and the second screw fastening portion 1224*d*. For example, a typical fastening bolt may be used as the clamping member 1230.

According to another example of the third embodiment of the present disclosure, a clamping ring having a ring shape may be provided to surround the support frame portion, and the entire periphery of the support frame portion may be tightened by the clamp ring.

As described above, according to the third embodiment of the present disclosure, the second nozzle member 1130 and the second support member 1220 are restrained by the clamping force applied to the support member (e.g., the second support member) by the clamping member. Therefore, it is possible to obtain an advantageous effect of stably maintaining the arrangement state of the second support member 1220 with respect to the second nozzle member 1130 and inhibiting the abnormal movement of the second support member 1220 relative to the second nozzle member 1130.

In this case, the clamping force applied to the second support member by the clamping member 1230 may be variously changed in accordance with required conditions and design specifications. The present disclosure is not restricted or limited by the magnitude of the clamping force. For reference, the clamping force applied to the second support member may be adjusted (increased or decreased) by operating the clamping member 1230 (e.g., rotating the clamping member 1230 clockwise or counterclockwise).

Figure 11:
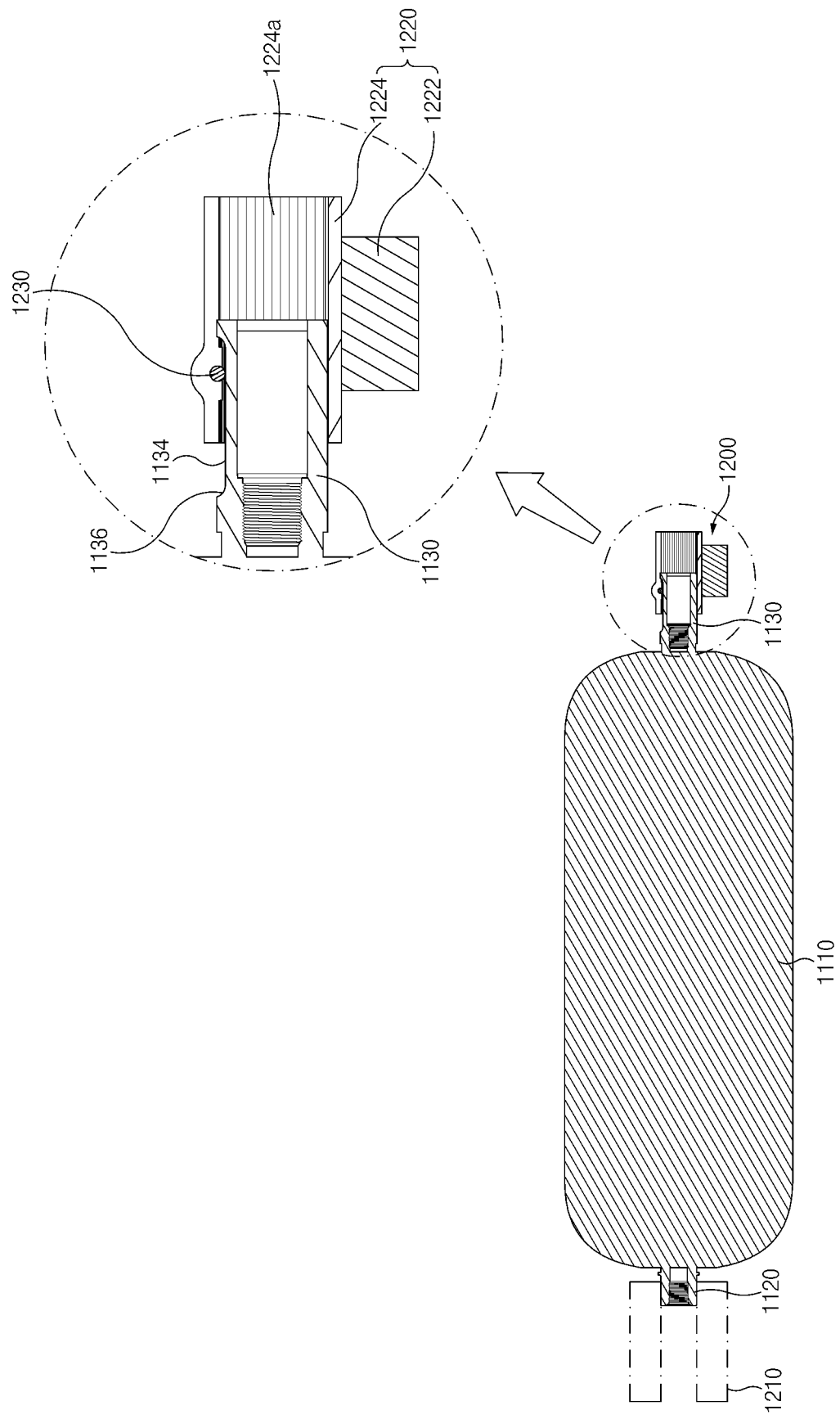
FIGS. 11 and 12 are views for explaining a support member of the pressure vessel fixing apparatus according to the third embodiment of the present disclosure.
Figure 12:
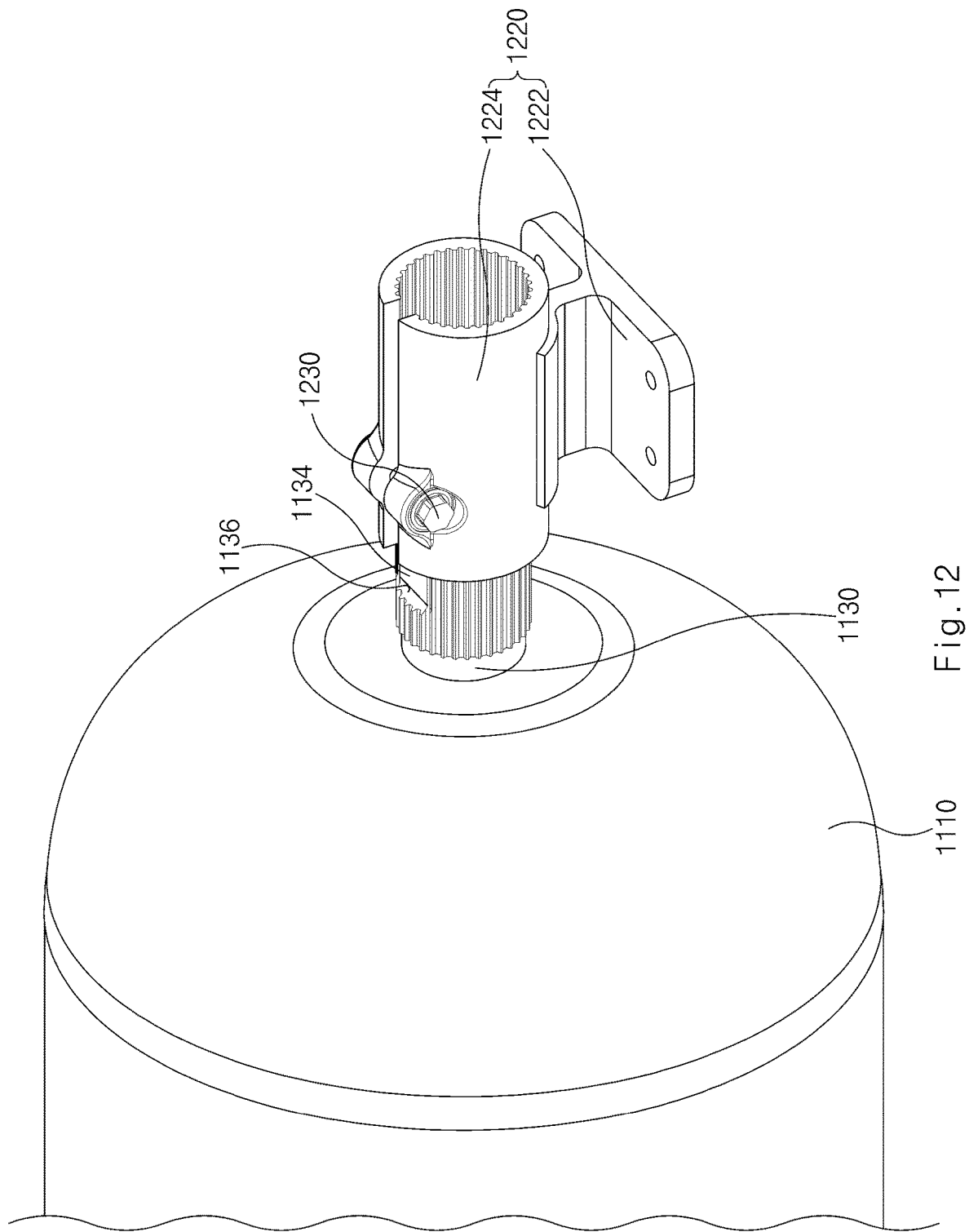

Referring to FIGS. 11 and 12, in the normal use state (the state in which no impact occurs), the arrangement state of the second support member 1220 with respect to the second nozzle member 1130 may be restrained (fixed) by the clamping force applied by the clamping member 1230.

Figure 13:
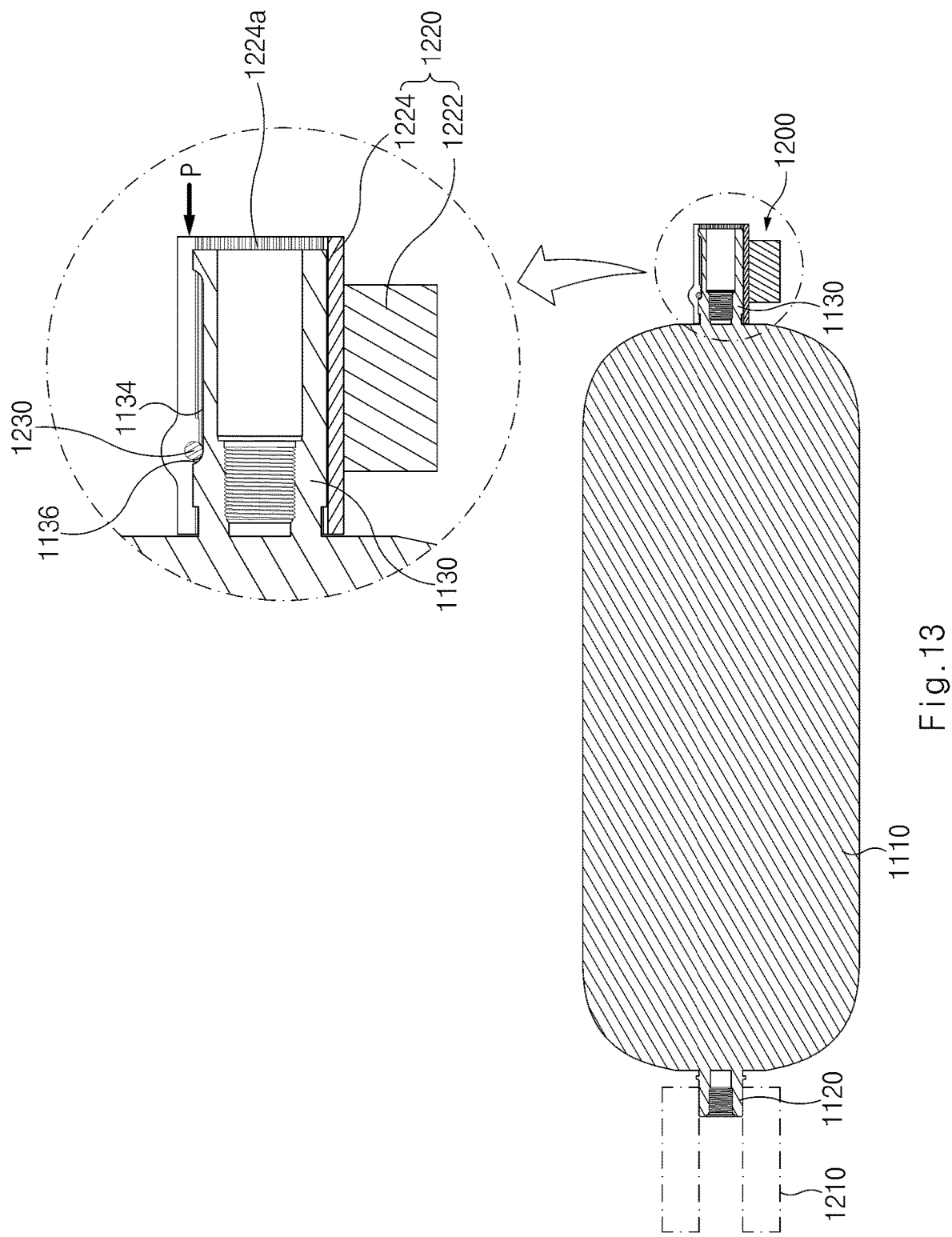
FIGS. 13 and 14 are views for explaining the support member of the pressure vessel fixing apparatus according to the third embodiment of the present disclosure in case of the occurrence of impact.
Figure 14:
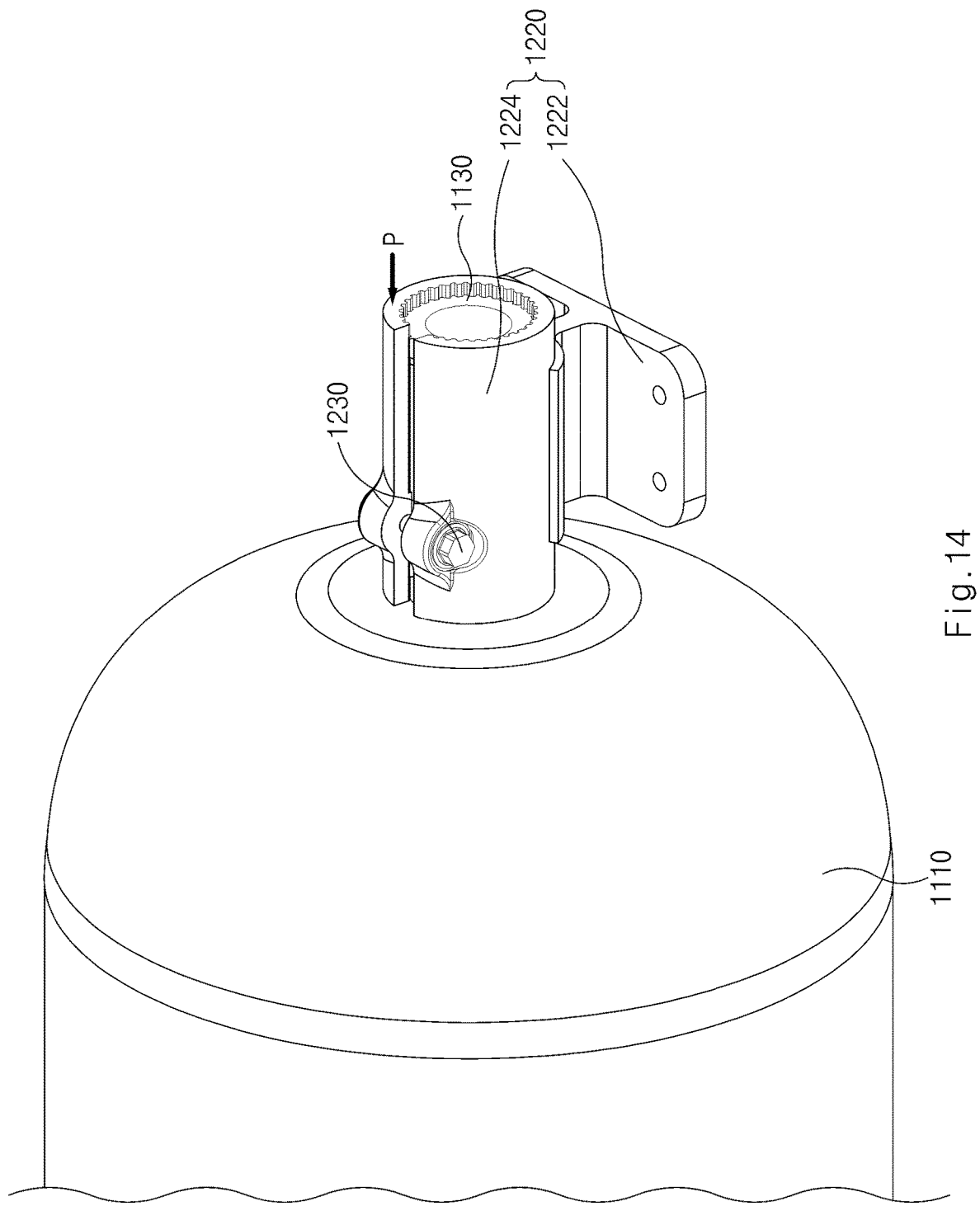

In contrast, referring to FIGS. 13 and 14, in case that an impact force (impact energy) P higher than the clamping force applied to the second support member (the restrictive force applied by the second support member to restrain the second nozzle member) is applied to the second support member, the second support member 1220 may rectilinearly move relative to the second nozzle member 1130 in a direction toward the vessel main body 1110, thereby mitigating (absorbing) the impact force P applied to the second support member 1220. As a result, it is possible to minimize the impact force P to be transmitted to the pressure vessel 1100 through the second nozzle member 1130.

According to the third exemplary embodiment of the present disclosure, the pressure vessel fixing apparatus 1200 may include an accommodation portion 1134 provided in an outer surface of the nozzle member and configured to accommodate the clamping member 1230 so that the clamping member 1230 is rectilinearly movable.

For example, the accommodation portion 1134 may be provided to be flat by partially removing the outer surface of the nozzle member. According to another example of the third embodiment of the present disclosure, a surface of the accommodation portion may be a curved surface.

Because the clamping member 1230 is accommodated in the accommodation portion 1134 provided in the outer surface of the nozzle member as described above, a degree to which the clamping member 1230 fastened to the second support member protrudes toward the outer surface of the second support member may be reduced. Therefore, it is possible to obtain an advantageous effect of minimizing the space required to mount the clamping member 1230, simplifying the structure of the pressure vessel fixing apparatus 1200, and reducing the size of the pressure vessel fixing apparatus 1200.

Referring to FIGS. 12 and 13, according to the third exemplary embodiment of the present disclosure, the pressure vessel fixing apparatus 1200 may include a stopper portion 1136 provided at an end of the accommodation portion 1134 disposed adjacent to the vessel main body and configured to restrict an approach of the clamping member 1230 to the vessel main body.

The stopper portion 1136 may be provided to have a stepped portion at the end of the accommodation portion 1134 and prevent the clamping member 1230 from approaching the vessel main body to a predetermined degree or more.

As described above, the stopper portion 1136 is provided at the end of the accommodation portion 1134, and the clamping member 1230 is restricted by the stopper portion 1136 when the support member approaches the vessel main body to the predetermined degree or more. Therefore, it is possible to inhibit an excessive movement of the support member relative to the vessel main body and restrict the movement stroke of the support member relative to the vessel main body.

According to the third exemplary embodiment of the present disclosure, the pressure vessel fixing apparatus 1200 may include: serration protrusions 1132 provided on the outer surfaces of the nozzle members 1120 and 1130 (e.g., the second nozzle member) in the longitudinal direction of the vessel main body 1110; and serration grooves 1224a provided in the support frame portion 1224 and configured to accommodate the serration protrusions 1132.

More specifically, the serration protrusion 1132 is provided on the outer surface of the second nozzle member 1130 and has a straight shape in the longitudinal direction of the vessel main body 1110. The serration protrusion 132 may be provided in plural, and the plurality of serration protrusions 132 is spaced apart from one another in the circumferential direction of the second nozzle member 1130.

The serration grooves 1224a are provided on an inner peripheral surface of the support frame portion 1224 and correspond to the serration protrusions 1132. The serration protrusions 1132 may engage with the serration grooves 1224a in the state in which the second nozzle member 1130 is accommodated in the support frame portion 1224.

As described above, according to the third embodiment of the present disclosure, the serration protrusions 1132 engage with the serration grooves 1224a in the state in which the second nozzle member 1130 is supported on the second support member 1220. Therefore, it is possible to inhibit the abnormal rotation of the pressure vessel 1100 relative to the second support member 1220 while allowing the rectilinear movement (the rectilinear movement in the longitudinal direction of the pressure vessel) of the second support member 1220 relative to the second nozzle member 1130. Therefore, it is possible to obtain an advantageous effect of more stably maintaining the arrangement state of the pressure vessel 1100 and inhibiting the withdrawal of valves and pipes caused by the abnormal rotation of the pressure vessel 1100.

According to the third embodiment of the present disclosure described above, it is possible to obtain an advantageous effect of inhibiting damage to and breakage of the pressure vessel and improving safety and reliability of the pressure vessel.

In particular, according to the third embodiment of the present disclosure, it is possible to obtain an advantageous effect of minimizing the impact to be transmitted to the pressure vessel through the support member and minimizing the damage to and breakage of the pressure vessel.

In addition, according to the third embodiment of the present disclosure, it is possible to obtain an advantageous effect of stably ensuring the arrangement state of the pressure vessel in the normal use state (in the state in which no impact occurs) and reducing the impact to be transmitted to the pressure vessel in case of the occurrence of impact caused by an accident or the like.

In addition, according to the third embodiment of the present disclosure, it is possible to obtain an advantageous effect of improving the structural rigidity and durability.

In addition, according to the third embodiment of the present disclosure, it is possible to obtain an advantageous effect of minimizing an assembling defect caused by the manufacturing tolerance and assembling tolerance of the pressure vessel and improving the assembling properties and workability.

In particular, there is a problem in that the pressure vessel is easily damaged or broken when impact (e.g., impact caused by a rollover accident of a vehicle) is applied to the side part of the pressure vessel. For this reason, there are problems in that a risk of a leak of hydrogen increases and safety and reliability of the pressure vessel deteriorate.

Therefore, recently, various studies have been conducted to ensure structural rigidity of the pressure vessel and improve safety and reliability of the pressure vessel, but the study results are still insufficient. Accordingly, there is a need to develop a technology to ensure structural rigidity of the pressure vessel and improve safety and reliability of the pressure vessel.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pressure vessel assembly, comprising:
   a pressure vessel, comprising:
   a cylinder part;
   a first side part and a second side part, the first side part and the second side part each having a dome shape and being provided at two opposite ends of the cylinder part;
   nozzle members respectively provided on the first side part and the second side part; and
   a plurality of protectors connected to the nozzle members and configured to surround a respective outer surface of the first side part and the second side part,
   wherein each of the plurality of protectors comprises:
      a protector body connected to a respective nozzle member and configured to cover the respective outer surface, and comprising at least one first through-hole; and
      an elastic layer provided on the protector body and configured to come into contact with the respective outer surface and to fill the at least one first through-hole.

2. The pressure vessel assembly of claim 1, wherein the plurality of protectors each has a dome shape corresponding to a shape of a respective side part of the first side part and the second side part.

3. The pressure vessel assembly of claim 1, wherein the elastic layer is integrated with each of the plurality of protectors by injection molding, and
   wherein the elastic layer is configured to cover a surface of the protector body.

4. The pressure vessel assembly of claim 3, further comprising:
   an exposure hole provided in the protector body,
   wherein the nozzle members pass through the exposure hole and are exposed to an outside of the protector.

5. The pressure vessel assembly of claim 4, further comprising:
   at least one second through-hole disposed in the protector body adjacent to the exposure hole,
   wherein the at least one second through-hole is exposed to an outside of the elastic layer.

6. The pressure vessel assembly of claim 5, wherein the at least one second through-hole is spaced apart from the at least one first through-hole.

7. The pressure vessel assembly of claim 4, further comprising:
   a first screw thread portion provided on an outer peripheral surface of the nozzle members; and
   a second screw thread portion provided on an inner wall surface of the exposure hole and configured to be screw-fastened to the first screw thread portion.

8. The pressure vessel assembly of claim 7, further comprising:
   a support member configured to be rectilinearly movable along a non-screw thread portion defined on an outer peripheral surface of the nozzle members, the support member being configured to support the nozzle members on an object.

9. The pressure vessel assembly of claim 3, wherein a tool seat portion is provided on the protector body and configured to be fastened to a fastening tool.

10. A pressure vessel protector, which protects a pressure vessel including a cylinder part, side parts provided at two opposite ends of the cylinder part and each having a dome shape, and nozzle members respectively provided on the side parts, the pressure vessel protector comprising:
   a protector body connected to a respective nozzle member of the nozzle members and configured to surround an outer surface of a respective side part of the side parts, and comprising at least one first through-hole; and an elastic layer provided on the protector body and configured to come into contact with the outer surface of the respective side part and to fill the at least one first through-hole.

11. The pressure vessel protector of claim 10, wherein the elastic layer is integrated with the protector body by injection molding, and wherein the elastic layer is configured to cover a surface of the protector body.

12. The pressure vessel protector of claim 10, further comprising:

an exposure hole provided in the protector body, wherein a respective nozzle member of the nozzle members passes through the exposure hole and is exposed to an outside of the protector body.

13. The pressure vessel protector of claim 12, further comprising:

a first screw thread portion provided on an outer peripheral surface of the respective nozzle member; and a second screw thread portion provided on an inner wall surface of the exposure hole and configured to be screw-fastened to the first screw thread portion.

14. The pressure vessel protector of claim 12, further comprising:

at least one second through-hole disposed in the protector body adjacent to the exposure hole, wherein the at least one second through-hole is exposed to an outside of the elastic layer.

15. The pressure vessel protector of claim 14, wherein the at least one second through-hole is spaced apart from the at least one first through-hole.

16. The pressure vessel protector of claim 10, wherein a tool seat portion is provided on the protector body, and wherein the tool seat portion is configured to be fastened to a fastening tool.

* * * * *